United States Patent
Ii

(10) Patent No.: US 8,300,246 B2
(45) Date of Patent: Oct. 30, 2012

(54) IMAGE FORMING APPARATUS AND HOST TERMINAL APPARATUS

(75) Inventor: Shoichi Ii, Tokyo (JP)

(73) Assignee: Oki Data Corporation, Tokyo (JP)

( * ) Notice: Subject to any disclaimer, the term of this patent is extended or adjusted under 35 U.S.C. 154(b) by 959 days.

(21) Appl. No.: 11/360,537

(22) Filed: Feb. 23, 2006

(65) Prior Publication Data

US 2006/0193001 A1    Aug. 31, 2006

(30) Foreign Application Priority Data

Feb. 28, 2005   (JP) ................................. 2005-053738

(51) Int. Cl.
*G06F 3/12* (2006.01)
*G06K 15/00* (2006.01)
*H04M 1/24* (2006.01)
*H04M 3/08* (2006.01)
*G03G 15/00* (2006.01)

(52) U.S. Cl. ...... 358/1.15; 358/1.1; 358/1.16; 358/1.17; 379/1.01; 379/1.04; 379/9.03; 379/9.04; 399/8; 399/10; 399/18

(58) Field of Classification Search .................. 358/1.15
See application file for complete search history.

(56) References Cited

U.S. PATENT DOCUMENTS

| 5,592,307 | A  | * | 1/1997  | Murai ............................ 358/468 |
| 5,790,640 | A  | * | 8/1998  | Tassa et al. .............. 379/100.15 |
| 5,848,318 | A  | * | 12/1998 | Okimoto ........................... 399/8 |
| 5,886,793 | A  | * | 3/1999  | Satou ............................ 358/404 |
| 7,002,702 | B1 | * | 2/2006  | Machida ...................... 358/1.15 |
| 7,034,954 | B1 | * | 4/2006  | Utsunomiya ................ 358/1.16 |
| 7,130,070 | B2 | * | 10/2006 | Evans et al. .................. 358/1.15 |
| 7,450,259 | B2 | * | 11/2008 | Gassho et al. .............. 358/1.15 |
| 2003/0063913 | A1 | * | 4/2003 | Yamazaki ......................... 399/8 |
| 2006/0114509 | A1 | * | 6/2006 | Itaki et al. .................... 358/1.15 |

FOREIGN PATENT DOCUMENTS

JP    2001-325089 A    11/2001

* cited by examiner

*Primary Examiner* — Hilina S Kassa
(74) *Attorney, Agent, or Firm* — Panitch Schwarze Belisario & Nadel LLP

(57) ABSTRACT

An image forming apparatus includes a storing section, an interface an abnormality-detecting section, and an information-outputting section. The storing section stores a first item of information on a print job that has been processed in accordance with data received in the image forming apparatus. The interface provides the first item of information stored in the storing section to an external apparatus. The abnormality-detecting section determines whether an abnormality has occurred in the external apparatus. The abnormality is detected based on a manner in which communication is performed between the image forming section and the external apparatus. The information-outputting section outputs a second item of information based on detection of abnormality performed by the abnormality-detecting section.

11 Claims, 24 Drawing Sheets

FIG.2

```
ESC%CONTROL START
    %CNT"UserName=Yamada"
    %CNT"JobName=abc.doc"
ESC%CONTROL END
```

FIG.5

| STORING AREA | CONTENT |
|---|---|
| PrinterName | PRINTER#1 |
| UserName | Yamada |
| JobName | abc.doc |
| TotalPage | 5 |

ESC%CONTROL START
%CNT"Log Request"
ESC%CONTROL END

FIG.15

ESC%CONTROL START
   %CNT"Transfer Request"
   %CNT"TransferSize=1024"
ESC%CONTROL END

FIG.16

ESC%CONTROL START
   %CNT"Transfer Status=OK"
ESC%CONTROL END

FIG.17

ESC%CONTROL START
   %CNT"Transfer Status=NG"
ESC%CONTROL END

FIG.18

```
%CONTROL START
%CNT"Print Log"
%CNT"Printer Name=PRINTER A"
%CNT"User Name=Yamada"
%CNT"Job Name=abc.doc"
%CNT"Print Number=5"
%CNT"Printer Name=PRINTER A"
%CNT"User Name=Kimura"
%CNT"Job Name=ef j.doc"
%CNT"Print Number=2"
         ⋮

⋮

%CNT"Printer Name=PRINTER A"
%CNT"User Name=Yamada"
%CNT"Job Name=zzz doc"
%CNT"Print Number=1"
ESC%CONTROL END
```

IMAGE FORMING APPARATUS AND HOST TERMINAL APPARATUS

BACKGROUND OF THE INVENTION

1. Field of the Invention

The present invention relates generally to a host terminal and an image forming apparatus that stores a print log therein, and more particularly to an abnormality-handling operation performed when an abnormality occurs.

2. Description of the Related Art

A recent image forming apparatus connected to a network is often shared by many host terminal apparatuses (e.g., personal computers) connected to the network. A server connected to the network manages the communication of signals between the image forming apparatus and many host terminal apparatuses. Such a network management system can be used as a billing system that bills the respective host terminal apparatuses according to the amount of usage of the image forming apparatus.

Such a billing system is commonly configured such that the image forming apparatus produces a print log for print jobs that are received from the host terminal apparatuses and processes the print log as print log information, and that the server compiles and manages the thus produced print log. The image forming apparatus produces a print log, and then stores the print log into a non-volatile memory such as an HDD or a flash memory provided therein or into a non-volatile memory such as a flash memory. Every time the image forming apparatus receives a request to obtain a request-to-obtain-print-log, the print log is read from the non-volatile memory, and is transferred to the server. The server compiles the received print log for each host terminal apparatus, and stores it as the print log information into a predetermined memory. Billing is then performed for each host terminal apparatus based on the print log information.

If an abnormality occurs in the server for some reason, the image forming apparatus may become unable to read the print log from the non-volatile memory. If it will take a long time before the abnormality is solved, the amount of print logs in the non-volatile memory of the image forming apparatus increases. When the total amount of data of print logs to be stored exceeds the capacity of the non-volatile memory, the printing should be stopped, in which case the oldest or latest print log has to be discarded. Thus, when the printing is resumed, it is difficult to know the current status of printing.

SUMMARY OF THE INVENTION

An object of the invention is to solve a problem that the printing has to be stopped if the amount of data to be stored exceeds the capacity of the memory for some reason.

Another object of the invention is to solve a problem that when the printing cannot be canceled the job log has to be discarded.

An image forming apparatus includes a storing section, an interface, an abnormality-detecting section, and an information-outputting section. The storing section stores a first item of information on a print job that has been processed in accordance with data received in the image forming apparatus. The interface provides the first item of information stored in the storing section to an external apparatus. The abnormality-detecting section determines whether an abnormality has occurred in the external apparatus, the abnormality being detected based on a manner in which communication is performed between the image forming section and the external apparatus. The information-outputting section outputs a second item of information based on detection of abnormality performed by the abnormality-detecting section.

The abnormality-detecting section includes a time interval measuring section that detects an elapsed time after a most recent communication between the image forming apparatus and the external apparatus. When the elapsed time exceeds a value, the abnormality-detecting section determines that the abnormality has occurred.

The information-outputting section comprises a display section that displays the information.

The information-outputting section provides a third item of information to a management apparatus that manages the external apparatus, the third item of information being based on abnormality detection performed by the abnormality-detecting section.

The image forming apparatus further includes print-control information storing section stores a message that should be transmitted to the management apparatus.

The image forming apparatus further includes a print log transferring section. When a total amount of data of print logs that should be stored is larger than a size of remaining memory area of the storing section, the print log transferring section transfers a print log to either another image forming apparatus or to a host terminal apparatus, the print log being a print log that cannot be stored in the storing section.

The image forming apparatus further includes a transfer permission requesting section that inquires either the another image forming apparatus or the host terminal apparatus of whether either the another image forming apparatus or the host terminal apparatus is ready to hold the print log that cannot be stored in the storing section.

The image forming apparatus further includes a transfer accepting section that receives a print log from another image forming apparatus connected via a network, the transfer accepting section storing the print log.

The image forming apparatus further includes a transfer acceptance determining section that receives a request for a transfer-permission from another image forming apparatus connected via a network, the transfer acceptance determining section makes a decision to determine whether the image forming apparatus is ready to hold the print log.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 2 illustrates the print control information attached to the print data;

FIG. 5 illustrates the print log according to the first embodiment;

FIG. 15 illustrates the request for transfer-permission;

FIG. 16 illustrates the transfer permitting signal;

FIG. 17 illustrates the transfer non-permitting signal;

FIG. 18 illustrates the transfer-log;

DETAILED DESCRIPTION OF TEE INVENTION

First Embodiment

Figure 1:
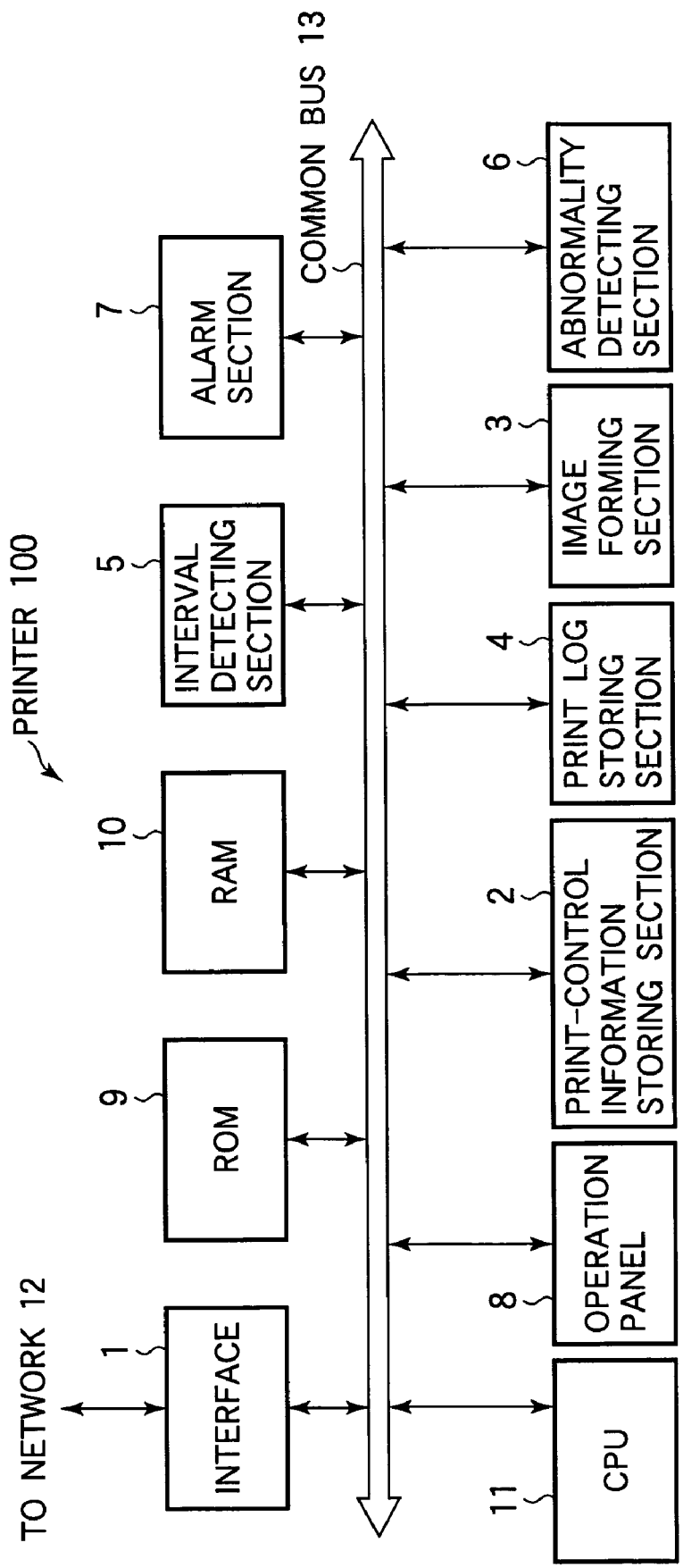
FIG. 1 is a block diagram illustrating the configuration of a printer 100 according to a first embodiment.

FIG. 1 is a block diagram illustrating the configuration of a printer 100 according to a first embodiment.

Referring to FIG. 1, the printer 100 includes an interface 1, print-control information storing section 2, image forming section 3, print log storing section 4, interval detecting section 5, abnormality detecting section 6, alarm section 7, operation panel 8, ROM 9, RAM 10, CPU 11, and common bus 13.

The interface 1 is located between the image forming apparatus 100 and a host apparatus, not shown, connected through a network 12, and serves as a data link through which print data is transmitted and received. The interface 1 receives print data together with print-control information from the host apparatus through the network 12, and receives a request-to-obtain-print-log from a server, not shown, over the network. The interface 1 transmits the print log stored in a print log storing section 4. The interface 1 also serves a means for identifying the types of received data (including all signals that are received in the interface 1) based on the printing information. The CPU 11 executes a program stored in the ROM 9 that activates an operation of identifying the type of received data. The printer 100 is designed to operate upon receiving print data together with the aforementioned printing information.

A description will be given of the content of the print data to which the print-control information is attached, and of the outline of the host terminal apparatus that attaches the printing information to the print data.

FIG. 2 illustrates the printing information attached to the print data.

"ESC % CONTROL START" at line 1 indicates that the following information is control information.

"ESC" represents a control code (1b in hexadecimal code). Line 2 beginning with % CNT represents various items of control information. "ESC % CONTROL END" line 4 represents the end of the control information. The example in FIG. 2 indicates that the user's name is "Yamada" and ho name is "abc.doc". These items of control information are attached to the print data. The aforementioned configuration of printing information is only exemplary and may be of any other format. The interface 1 identifies the type of the received data based on the information in FIG. 2.

Figure 3:
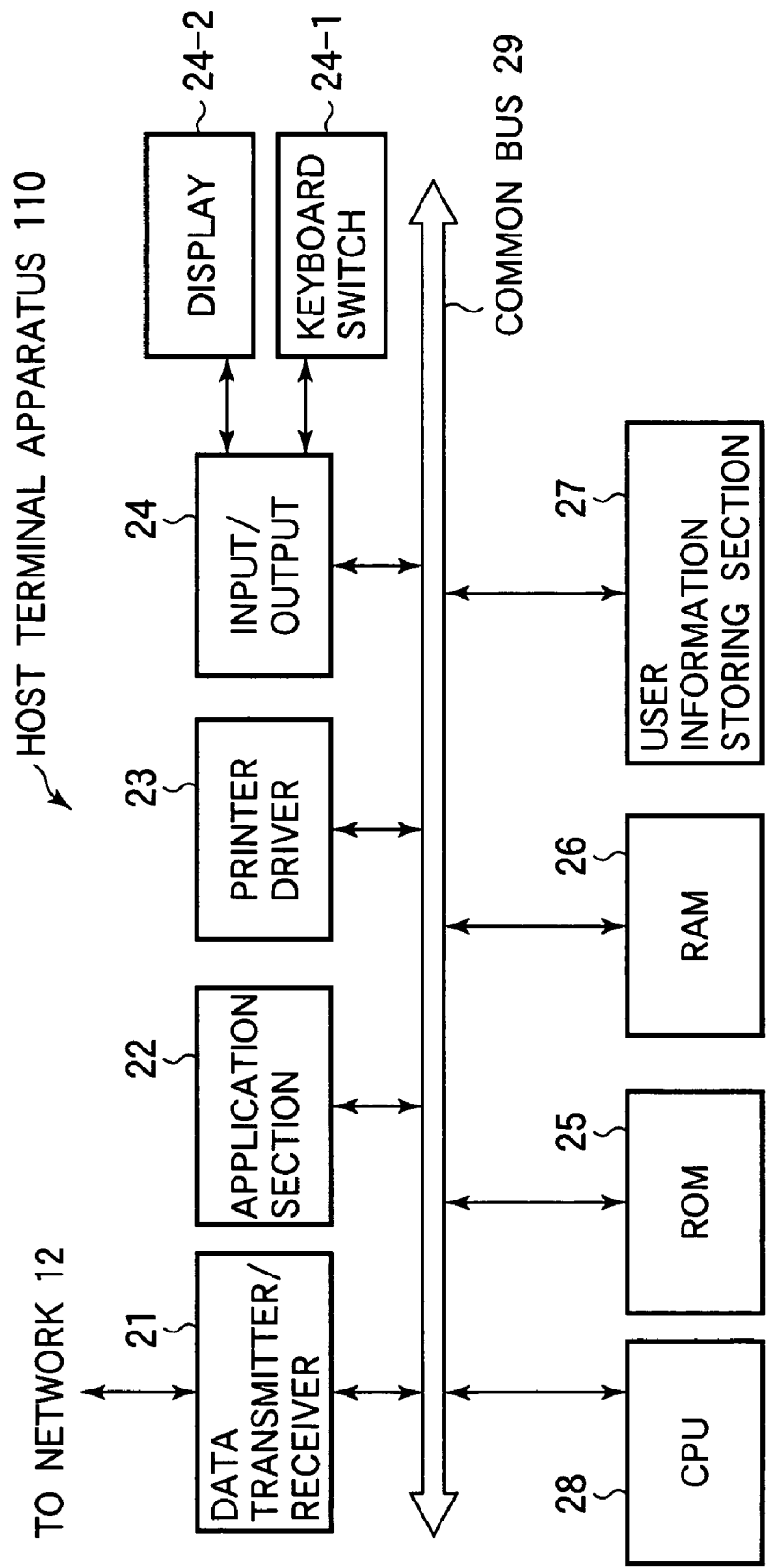
FIG. 3 is a block diagram illustrating the configuration of the host terminal apparatus according to the first embodiment.

FIG. 3 is a block diagram illustrating the configuration of the host terminal apparatus according to the first embodiment.

A host terminal apparatus 110 is, for example, a personal computer that produces print data. The host terminal apparatus 110 receives image information from a user, and converts the image information into print data. Then, the host terminal apparatus 110 transmits the print data together with various items of control information to the printer 100 over the network 12. The host terminal apparatus 110 includes a data transmitter/receiver 21, application section 22, printer driver 23, input/output port 24, ROM 25, RAM 26, user information storing section 27, CPU 28, and common bus 29. The common bus 29 interconnects the individual system components.

The data transmitter/receiver 21 receives the print data together with various items of control information from the printer deriver 23, and transmits the data and various items of control information to the printer 100. In other words, the data transmitter/receiver 21 serves as an interface that connects the host terminal apparatus 110 to the network 12.

The application section 22 receives the image information through or a keyboard switch 24-1 of the input/output port 24 from the user. The application section 22 edits the image information and displays the edited image information on a display 24-2. Then, the application section 22 provides the edited image information to the printer driver 23 in response to the user's command. The application section 22 is activated when the CPU 28 executes a program previously stored in the ROM 25.

The input/output port 24 includes the display 24-2 and keyboard switch 24-1. The display 24-2 displays the edited image information and the overall control status of the apparatus to the user. The user operates the keyboard switch 24-1 to input characters and graphics. The input/output port 24 serves as a man-machine interface between the user and the host apparatus 110.

The ROM 25 is a read only memory that stores the control program and data associated with the control program. The CPU 28 executes the control program for performing the overall control of the apparatus. The RAM 26 provides a temporary memory area required when the CPU 28 executes the control program.

The user information storing section 27 stores user information (e.g., UserName) of all users who use the host terminal apparatus 110. The CPU 28 executes the control program stored in the ROM 25 or a hard disk, not shown, to perform the overall control of the apparatus.

A description will now be given of the operation in which the host terminal apparatus 110 produces the print data to which the printing information is attached.

Figure 4:
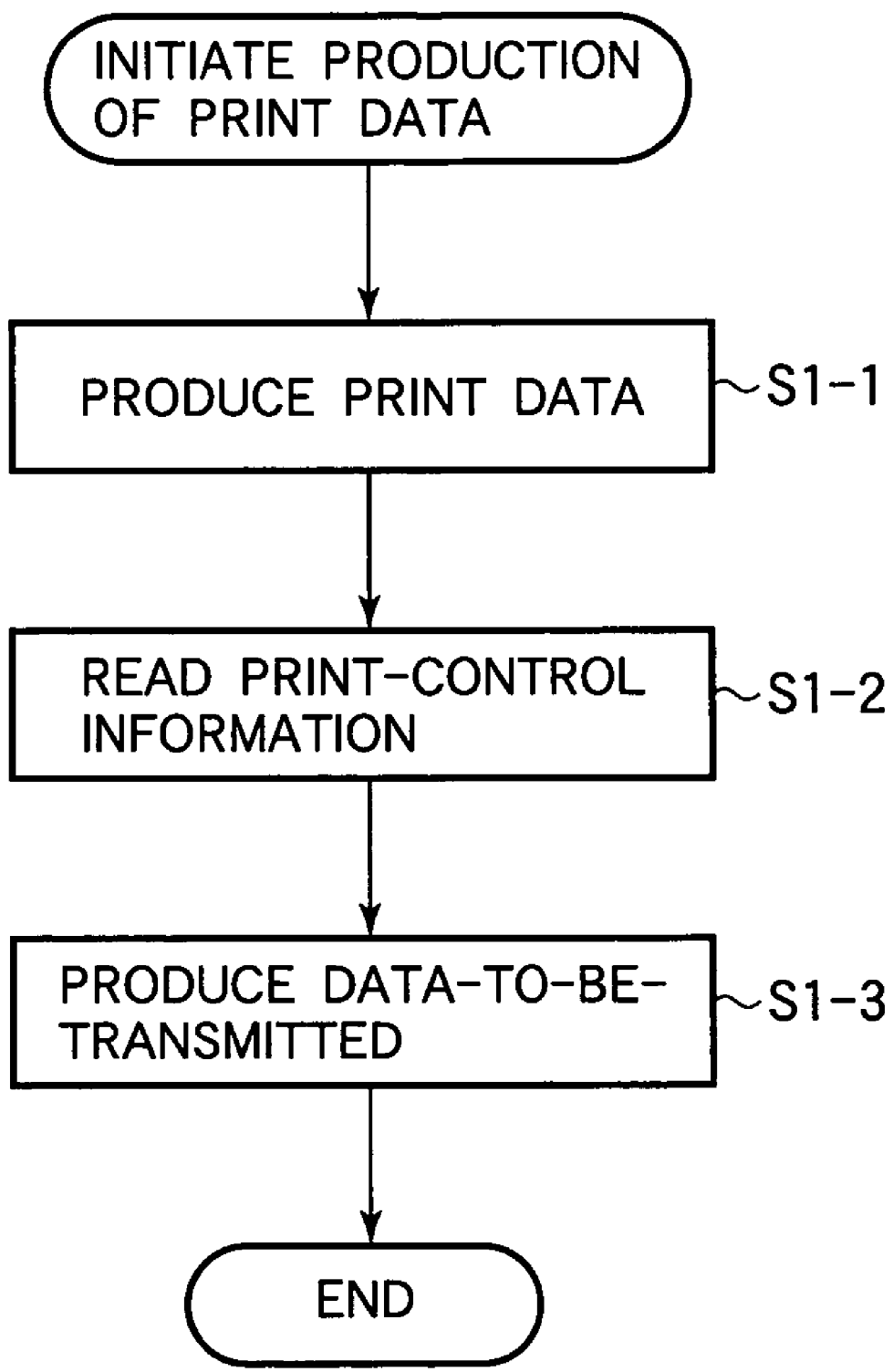
FIG. 4 is a flowchart illustrating the operation of the host terminal apparatus.

FIG. 4 is a flowchart illustrating the operation of the host terminal apparatus 110.

Step S1-1: The user inputs characters, graphics, and symbols through the keyboard switch 24-1. The application section 22 receives and edits the characters, graphics, and symbols, and then displays the edited characters, graphic, and symbols on the display 24-2. After the user has input all the image information, the application section 22 outputs the image information to the printer driver 23. The printer driver 23 in turn converts the received image information into printer data.

Step S1-2: The printer driver 23 reads necessary print-control information from the user information storing section 27.

Step S1-3: The printer driver 23 attaches the print-control information (FIG. 2) to the print data to produce data-to-be-transmitted. This data-to-be-transmitted is directed to the data transmitter/receiver 21. Then, the program ends.

Referring to back to FIG. 1, the configuration of the printer 100 will be described.

The CPU 11 obtains the print-control information for the print data and stores the print-control information into the print-control information storing section 2. The print-control information storing section 2 in the first embodiment is a memory area defined in the RAM 3, but may take the form of a separate memory.

The image forming section 3 is a print engine that operates to print the received print data under the control of the CPU 11. The CPU 11 (FIG. 1) produces the print log associated with the printing operations of print jobs performed by the image forming section 3, and stores the print log into the print log storing section 4. The print log memory takes the form of a non-volatile memory such as a flash memory. An example of the print log produced by the CPU 11 will be described.

FIG. 5 illustrates the print log according to the first embodiment. Referring to FIG. 5, the print log produced by the CPU 11 includes four storing areas: PrinterName, UserName, JobName and TotalPage. PrinterName stores the name of a printer. UserName stores the user's name set in the client computer that requested printing. JobName stores the name of a printed document. TotalPage stores the total number of printed pages.

Referring back to FIG. 1, the description of the configuration of the printer 100 will be continued.

The interval detecting section 5 times a time interval between a request-to-obtain-print-log currently received from the server and a most recently received request-to-obtain-print-log. The interval detecting section 5 is activated when the CPU 11 executes a program stored in the ROM 9, and detects a time elapsed after a most recent request-to-obtain-print-log by means of a timer, not shown, in the CPU 11. The first embodiment requires to detect a time elapsed after a most recent request-to-obtain-print-log is received from the server. The outline of the configuration and operation of the server will be described.

Figures 6, 7:
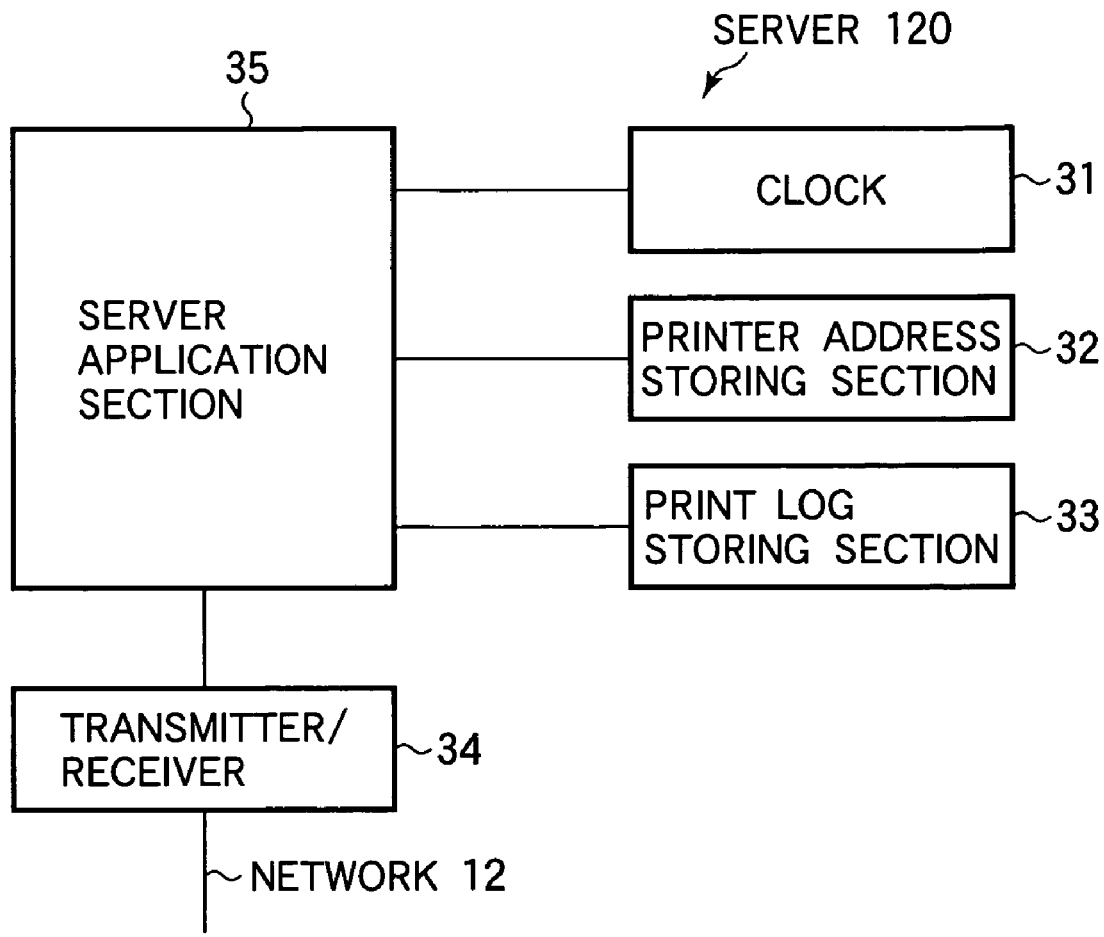
FIG. 6 is a block diagram illustrating the configuration of the server.
FIG. 7 illustrates the request-to-obtain-print-log.

FIG. 6 is a block diagram illustrating the configuration of the server 120. Referring to FIG. 6, the server 120 includes a clock 31, printer address storing section 32, print log storing section 33, transmitter/receiver 34, and server application section 35.

The clock 31 controls the time at which the request-to-obtain-print-log is transmitted to the printer 100. The clock 31 generates a reference time interval TO at which the request-to-obtain-print-log is transmitted.

The printer address storing section 32 is a memory area in which the address of the printer 100 connected to the network 12 is stored. The printer address storing section 32 is a non-volatile memory.

The print log storing section 33 classifies the print log received from the printer 100 according to user, and stores the classified print log. The print log storing section 33 takes the form of a non-volatile memory. The transmitter/receiver 34 receives the request-to-obtain-print-log from the server application section 35, and transmits the request-to-obtain-print-log to the printer 100 over the network 12. The transmitter/receiver 34 is an interface through which the server 120 transmits and receives the print log. The server 120 transmits and receives through the server application 35 to and from the printer 100 over the network 12.

The server application 35 obtains the address of a printer from the printer address storing section 32, and then outputs a request-to-obtain-print-log through the transmitter/receiver 34 over the network 12 to that printer under the control of the clock 31. The server application 35 is activated when a CPU, not shown, executes a control program stored in a ROM, not shown.

FIG. 7 illustrates the request-to-obtain-print-log. Referring to FIG. 7, "ESC % CONTROL START" at line 1 indicates that the following information is control information. "ESC" represents a control code (1b in hexadecimal code) Line 2 beginning with % CNT represents various items of control information. % CNT"Log Request" at line 2 indicates that this signal is a request-to-obtain-print-log. ESC % CONTROL END at line 3 indicates the end of the control information. However, these are only exemplary and can be expressed in any other suitable format.

Figure 8:
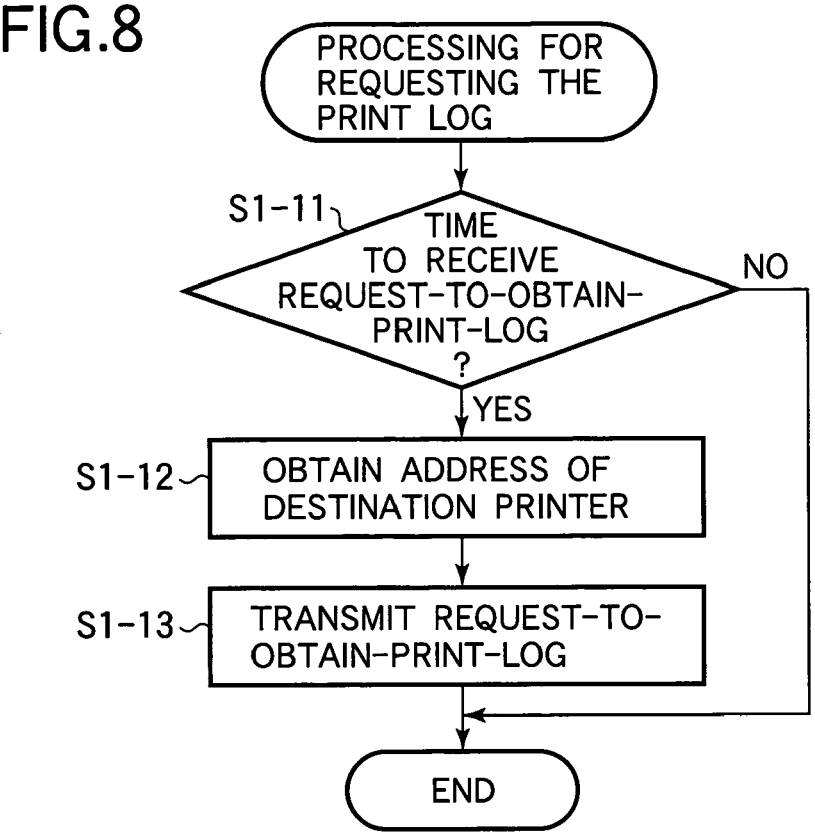
FIG. 8 is a flowchart illustrating the processing for requesting for print log.

The operation of the server will be described. FIG. 8 is a flowchart illustrating the processing for requesting the print log is requested.

Step S1-11: The server application 35 (FIG. 6) monitors the clock 31. If the clock 31 indicates the time at which the request-to-obtain-print-log should be sent to the printer 100, the program proceeds step S1-12. If NO, the program ends.

Step S1-12: The server application 35 obtains the address of a destination printer from the printer address storing section 32.

Step S1-13: The server application 35 generates a request-to-obtain-print-log and sends it to the destination printer through the transmitter/receiver 34 over the network 12. Then, the program ends.

Figure 9:
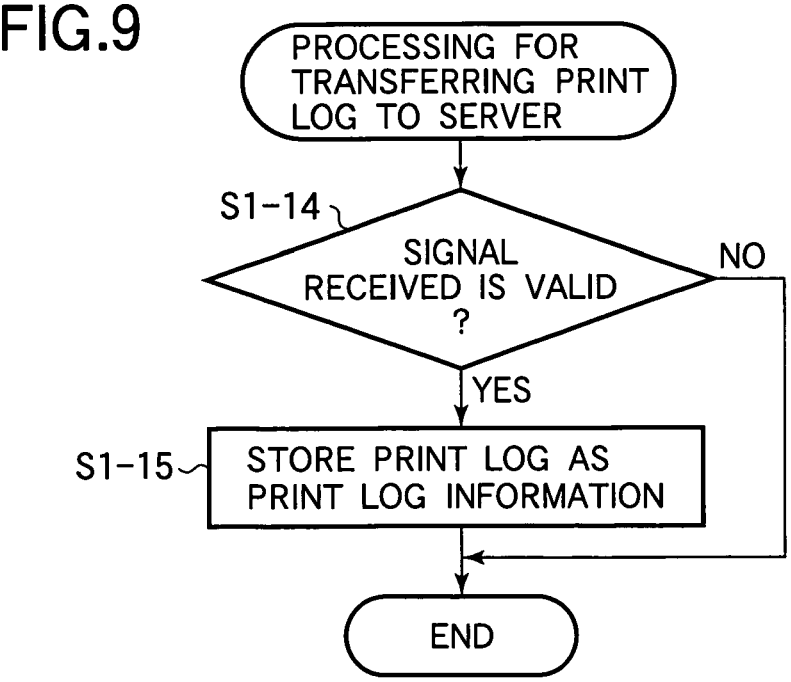
FIG. 9 is a flowchart illustrating the process performed by the server for obtaining a print log.

FIG. 9 is a flowchart illustrating the process performed by the server for obtaining the print log. This flowchart describes the processing for transferring the print log to the server upon receiving the request-to-obtain-print-log.

Step S1-14: The server application 35 makes a decision to determine whether the signal received via the transmitter/receiver 34 is a valid print log. If the answer is YES, then the program proceeds to S1-15. If the answer is NO, then the program ends.

Step S1-15: The server application 35 stores the print log, received via the transmitter/receiver 34, into the print log storing section 33. This print log is stored as print log information.

Referring back to FIG. 1, the configuration of the printer 100 will be described. When the time interval t of the request-to-obtain-print-log timed by the interval detecting section 5 is equal to or larger than the previously set a reference time interval TO, the abnormality detecting section 6 determines that an abnormality has occurred in the server 120. The abnormality detecting section 6 is activated when the CPU 11 executes a program previously stored in the ROM 9. In the embodiment, the reference time interval TO is assumed to have been previously stored in the ROM 9.

When the abnormality detecting section 6 detects that an abnormality occurred in the server, the alarm generating section alarm section 7 provides an alarm to the user by displaying the occurrence of abnormality on the display of the operation panel 8. The alarm generating section 7 is activated when the CPU 11 executes a program previously stored in the ROM 9. The alarm may be a voice alarm instead of a display.

The operation panel 8 includes a displaying means for displaying an alarm message, for example, "No request for server alarm log" to the user, and an input means for the user to input the necessary information for the respective information items. The operation panel 8 serves as a man-machine interface between the user and the printer 100.

The ROM 9 is a memory in which the control program executed by the CPU 11 for performing the overall control of the apparatus, and data associated with the overall control. In addition to the control program for overall control, the apparatus also has a control program for activating the interval detecting section 5, abnormality detecting section 6, alarm generating section 7, and identifying means for identifying the type of data received through the interface 1.

The ROM 10 is a memory that has an area for arithmetic and logic operations required when the CPU 11 executes the control program. A part of the ROM 10 serves as the print-control information storing section 2.

The CPU 11 performs the overall control of the apparatus by executing the control program previously stored in the ROM 9. The CPU 11 also executes a predetermined program to activating the interval detecting section 5, abnormality detecting section 6, alarm generating section 7, and a means in the interface 1 for identifying the type of the received data. The common bus 13 interconnects all of the sections in the apparatus. The common bus 13 may be replaced by an ASIC exclusively configured for the printer 100.

A description will be given of a system that is configured with the printer 100, host terminal apparatus 110, and server 120.

Figure 10:
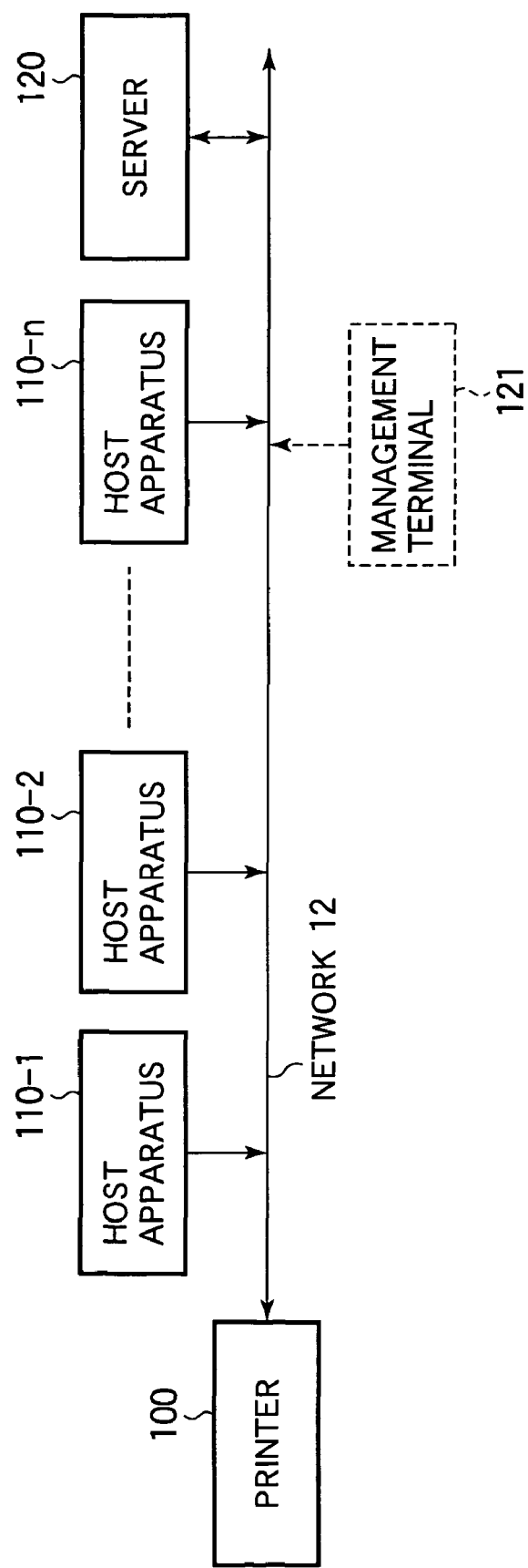
FIG. 10 illustrates the configuration of a network of a printing system according to the first embodiment.

FIG. 10 illustrates the configuration of a network of a printing system according to the first embodiment. At least one printer 100, at least one server 120, and host terminal apparatuses 110-1 to 110-*n* are interconnected via the network 12. The network 12 takes the form of a bus in FIG. 10. However, the network 12 may take other form such as a star-shaped configuration, or a ring-shaped configuration or a combination of a plurality of forms.

The system may also include a management terminal 121 connected to the network 12 such that when an abnormality occurs, the alarm section 7 informs the management terminal 121 of the occurrence of abnormality so that an administrator knows the abnormality.

The print-control information storing section 2 also holds an IP address of the management terminal 121. Upon receiving the request-to-obtain-print-log from the server 120, the interval detecting section 5 starts to time and continues to time until the next request-to-obtain-print-log. If an elapsed time exceeds a predetermined value but no request-to-obtain-print-log is received, then the abnormality detecting section 6 determines that some abnormality has occurred in the server 120. Then, the abnormality detecting section 6 causes the alarm section 7 to obtain the IP address of the management terminal 121 and transmit a message indicative of the occurrence of abnormality to the server 120. This message is, for example, "An abnormality has occurred in the server," and is previously stored in the print-control information storing section 2. The message and IP address may be either inputted from the operation panel of the printer or previously transmitted from the management terminal to the printer (in which case the message and IP address have been stored previously in the management terminal 121). Alternatively, the message may be transmitted to a host apparatus owned by the administrator.

The operation of the printer 100 will be described.

Figure 11:
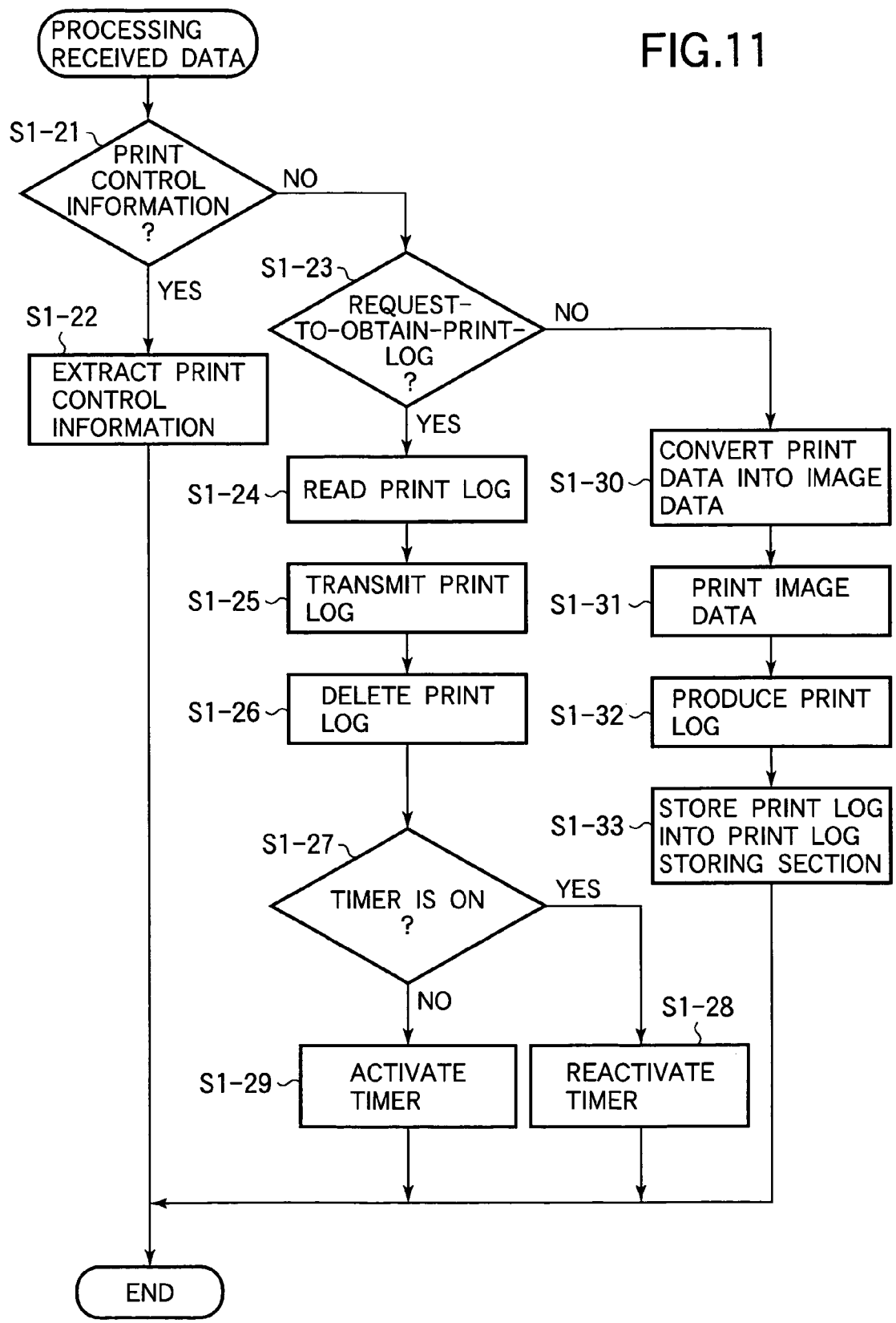
FIG. 11 is a flowchart illustrating the operation of the printer.

FIG. 11 is a flowchart illustrating the operation of the printer 100. The flowchart describes the processing of the received data performed in the printer 100.

Step S1-21: The interface 1 makes a decision to determine whether the received data is the print control information (FIG. 2) transmitted from the host terminal apparatus 110. If the answer is YES, then the program proceeds to step S1-22. If the answer is NO, the program proceeds to step S1-23.

Step S1-22: The CPU 11 extracts the print-control information (FIG. 2) and stores it into the print-control information storing section 2 and the program ends.

Step S1-23: The interface 1 makes a decision to determine whether the received data is the request-to-obtain-print-log (FIG. 7). If the answer is YES, then the program proceeds to S1-24. If the answer is NO, the program proceeds to step S1-30.

Step S1-24: The CPU 11 reads the print log from the print log storing section 4

Step S1-25: The CPU 11 transmits the print log to the server 120 (FIG. 6) via the interface 1.

Step S1-26: The CPU 11 deletes the print log that has been transmitted to the server 120 from the print log storing section 4. Because this print log no longer needs to be held in the print log storing section 4.

Step S1-27: The CPU 11 makes a decision to determine whether the timer has been set ON. If the timer has been ON, the program proceeds to step S1-28. If timer has not been ON, the program proceeds to S1-29.

Step S1-28: The CPU 11 reactivates the timer again, and then program ends.

Step S1-29: The CPU 11 activates the timer, and then the program ends.

It should be noted that performing step S1-28 or step S1-29 enables accurate measurement or detection of a time elapsed from when a request-to-obtain-print-log is received until reception of the next request-to-obtain-print-log is received.

Step S1-30: The received data is print data. Therefore, the CPU 11 converts the print data into image data (dot data), and expands it in the RAM 10.

Steps S1-31: The image forming section 3 receives the image data (dot data) and prints on a print medium.

Step S1-32: The CPU 11 produces the pint log.

Step S1-33: The CPU 11 stores the print log into the print log storing section 4, and then the program ends.

Figure 12:
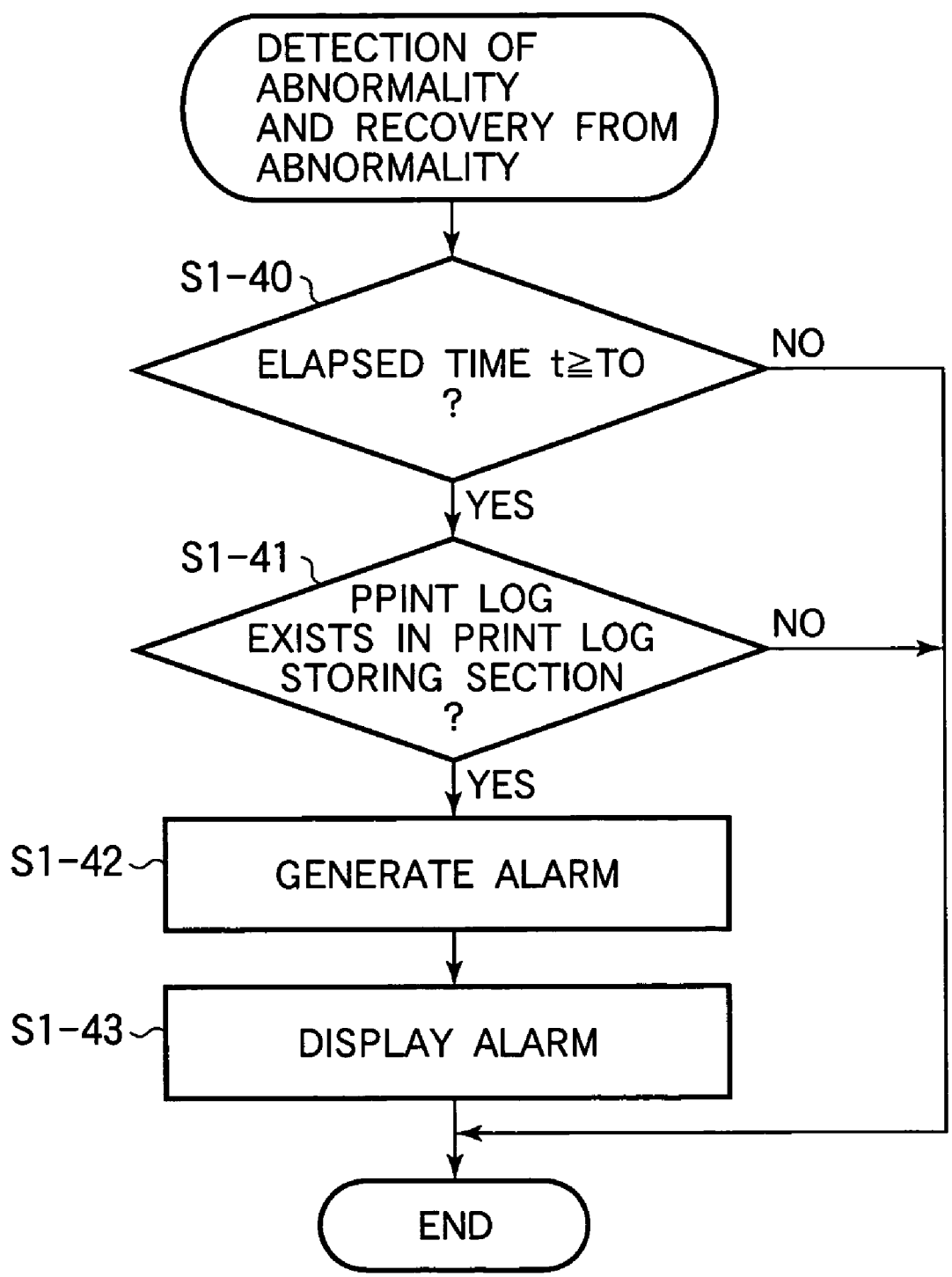
FIG. 12 is a flowchart illustrating the operation of the printer.

FIG. 12 is a flowchart illustrating the operation of the printer. The flowchart describes the detection of abnormality and the process of addressing the abnormality.

Step S1-40: The interval detecting section 5 reads the time interval (elapsed time) t from the timer. If the time interval t is equal to or larger than the reference TO, the program proceeds to step S1-41. If the time interval t is less than the reference TO, the program ends.

Step S1-41: When the time interval t is equal to or larger than the reference TO and the print log has not been stored in the print log storing section 4, the abnormality detecting section 6 determines that there is no significant detrimental effect. Thus, the program ends. If the print log has been stored in the print log storing section 4, the program proceeds to step S1-42.

Step S1-42: The abnormality detecting section 6 determines that an abnormality has occurred in the server (i.e., server down).

Step S1-43: The alarm section 7 causes the display of the operation panel 8 to display the occurrence of abnormality to the user. Then, the program ends.

As described above, when an abnormality occurs, the alarm section 7 provides an alarm to the user of the printer, so that the user can act to remedy the abnormality before the total amount of data of the print log that should be stored exceeds the capacity of the print log storing section 4. Thus, the embodiment prevents the problem of aborting print log. Moreover, even if the print log has been discarded, the history of printing is prevented from becoming inaccurate.

Second Embodiment

A printer 200 according to a second embodiment is configured such that when an abnormality occurs in a server, a print log having a size (amount of data) in excess of the capacity of a print log storing section is temporarily saved to another printer to prevent the halt of a printing operation or the abortion of the print log.

Figure 13:
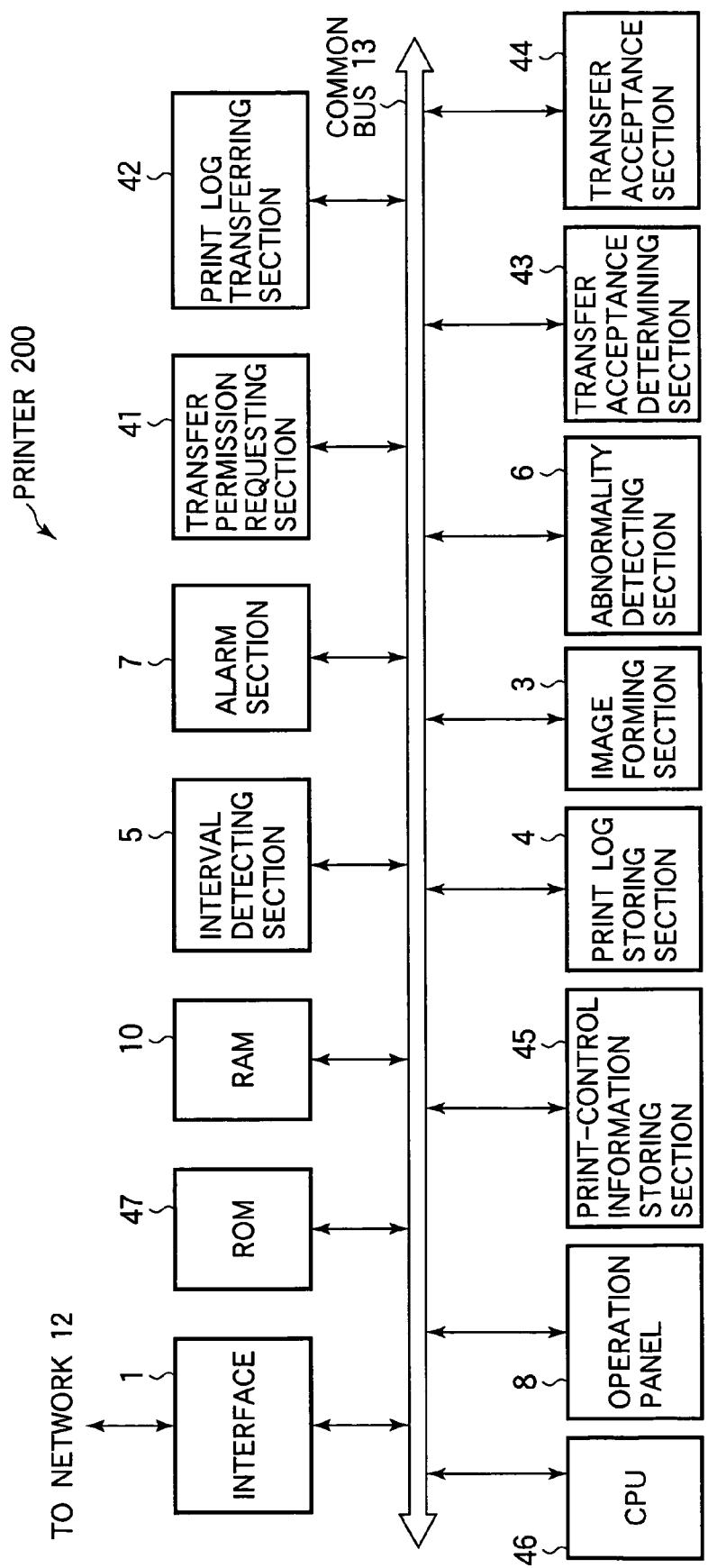
FIG. 13 is a block diagram of the printer according to a second embodiment.

FIG. 13 is a block diagram of the printer 200 according to the second embodiment. Referring to FIG. 13, the printer 200 includes an interface 1, image forming section 3, print log storing section 4, interval detecting section 5, abnormality detecting section 6, alarm section 7, operation panel 8, RAM 10, common bus 13, transfer permission requesting section 41, print log transferring section 42, transfer acceptance determining section 43, transfer accepting section 44, print-control information storing section 45, CPU 46, and ROM 47. Elements similar to those in the first embodiment have been given the same reference numerals and their description is omitted.

The transfer permission requesting section 41 detects the size of remaining memory area Ue of the print log storing section 4 and then compares the Ue with the amount of data Ux of the print log that should be stored. If Ux>Ue, then the transfer permission requesting section 41 transmits a request for transfer-permission to another printer to which the printer 200 intends to temporarily save the print log. The transfer permission requesting section 41 is activated when the CPU 46 executes a program stored in the ROM 47.

Upon receiving a transfer permitting signal from the destination printer, the print log transferring section 42 reads a print log from the print log storing section 4 and transmits the print log to the destination printer. Upon receiving a transfer non-permitting signal from the destination printer, the print log transferring section 42 causes the alarm section 7 to display an alarm of a "log-full" state. The print log transferring section 42 is activated when the CPU 46 executes a program stored in the ROM 47.

The transfer permission requesting section 43 detects the size Ue of remaining memory area of the print log storing section 4 and then compares the size Uy with the amount of data to be transmitted. If Ue>Uy, then the transfer permission requesting section 43 transmits the transfer permitting signal (transfer status) to the printer of a source of request. If Ue>Uy, then, the transfer permission requesting section 43 transmits the transfer non-permitting signal (non-transfer status) to the printer of a source of request. The transfer permission requesting section 43 is activated when the CPU 46 executes a program stored in the ROM 47.

The transfer accepting section 44 stores the received print log into the address of the print log storing section 4. The transfer accepting section 44 is activated when the CPU 46 executes a program stored in the ROM 47.

The print-control information storing section 45 is a memory that stores the print-control information (FIG. 2) extracted from the print data by the CPU 46. The print-control information storing section 45 is usually a memory area within the RAM 3. Of course, an exclusive memory may be used instead of the RAM 3.

The CPU 46 is a microprocessor that executes the control program previously stored in the ROM 47 to control the entire apparatus. The CPU 46 also executes a program to activate the transfer permission requesting section 41, print log transferring section 42, transfer permission requesting section 43, and transfer accepting section 44.

The ROM 47 is a read only memory that previously stores the control program for performing the overall control of the apparatus and data associated with the overall control. The ROM 47 further stores control programs for activating the transfer permission requesting section 41, print log transferring section 42, transfer permission requesting section 43, and transfer accepting section 44. The rest of the second embodiment is the same as that of the first embodiment and the description is omitted.

The operation of the printer 200 will be described.

Figure 14:
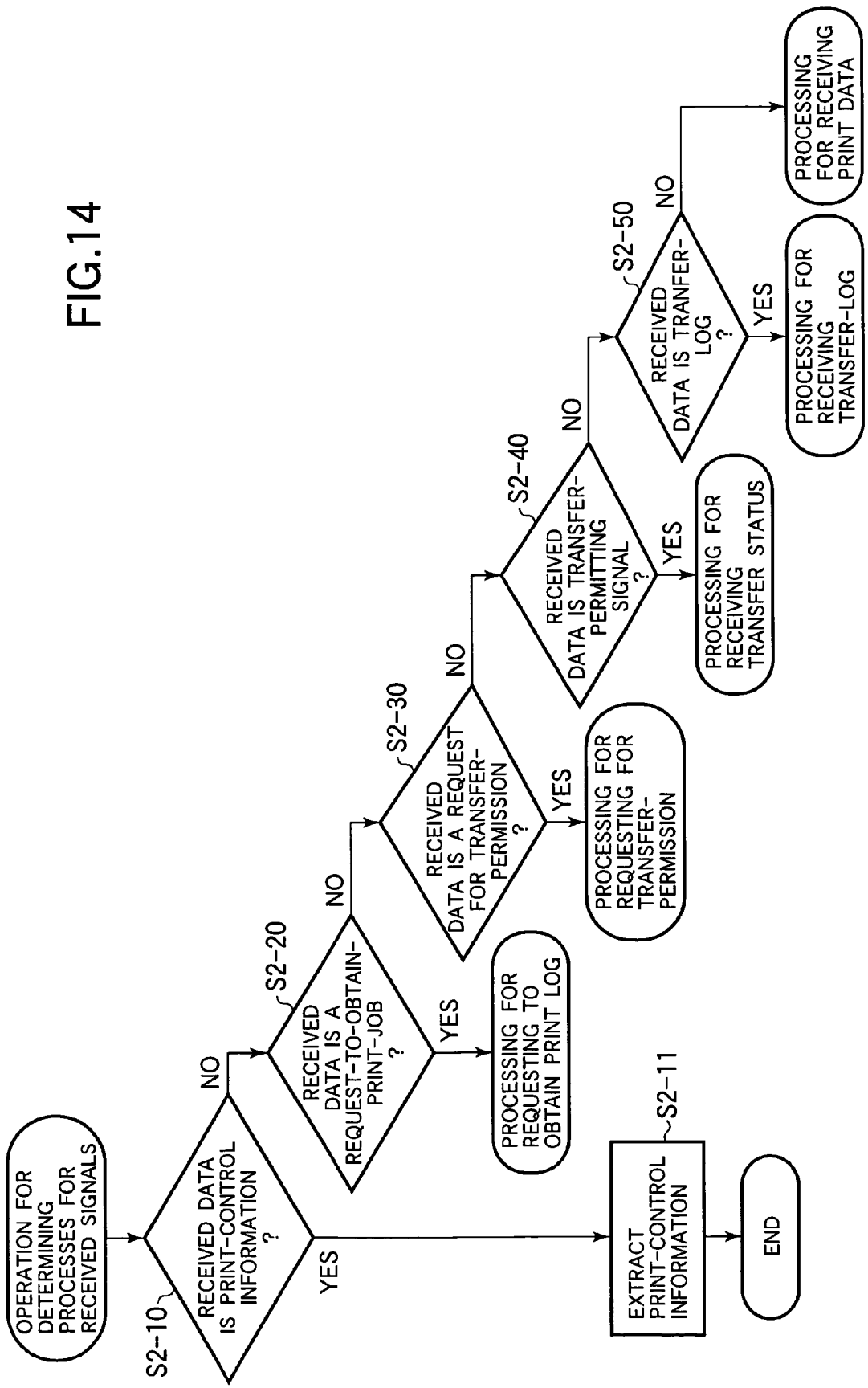
FIG. 14 is a flowchart illustrating the operation of the printer.

FIG. 14 is a flowchart illustrating the operation of the printer 200. The flowchart describes the operation for determining various processes that should be performed for the signals received in the printer 200: processing for extracting print-control information, processing for requesting to obtain print log, processing for requesting for transfer-permission, processing for receiving transfer status, processing for receiving transfer-log, and processing for receiving print data.

Step S2-10: The interface 1 makes a decision to determine whether the received data is the print-control information transmitted from the host terminal apparatus 110. If the answer is YES, then the program proceeds to step S2-11. If the answer is NO, then the program proceeds to step S2-20.

Step S2-11: The CPU 46 extracts the print-control information from the received print data and stores it into the print-control information storing section 45 (FIG. 13). Then, the program ends.

Step S2-20: The interface 1 makes a decision to determine whether the received data is a request-to-obtain-print-log transmitted from the server 120. If the answer is YES, then the program proceeds to the processing for requesting to obtain print log. If the answer is NO, then the program proceeds to step S2-30.

Step S2-30: The interface 1 makes a decision to determine whether the received data is a request for transfer-permission transmitted from the other printer. If the answer is YES, then the program proceeds to the processing for requesting for transfer-permission. If the answer is NO, the program proceeds to step S2-40.

The request for transfer-permission will be now described.

FIG. 15 illustrates the request for transfer-permission. Referring to FIG. 15, ESC % CONTROL START at line 1 indicates that the following information is control information. "ESC" represents a control code ($1b$ in hexadecimal code). Line 2 beginning with % CNT represents various items of control information. "% CONT"Transfer Request" at line 2 indicates that this is a request for transfer-permission. "ESC % CONTROL END at line 3 represents the end of the control information. The aforementioned configuration of printing information is only exemplary and may be of any other format.

Referring back to FIG. 14, the description of the operation of the printer 200 will be continued.

Step S2-40: The interface 1 makes a decision to determine whether the received data is a transfer permitting signal transmitted from other printer. If the answer is YES, the program proceeds to the processing for receiving transfer status. If the answer is NO, the program proceeds to step S2-50.

The transfer permitting signal and transfer non-permitting signal will now be described.

FIG. 16 illustrates the transfer permitting signal. Referring to FIG. 16, ESC % CONTROL START at line 1 indicates that the following information is control information. "ESC" represents a control code (1b in hexadecimal code). Line 2 beginning with % CNT represents various items of control information. "% CONT"Transfer Status=OK" at line 2 indicates that this is a transfer permitting signal. "ESC % CONTROL END at line 3 represents the end of the control information. The aforementioned configuration of printing information is only exemplary and may be of any other format.

FIG. 17 illustrates the transfer non-permitting signal. Referring to FIG. 17, ESC % CONTROL START at line 1 indicates that the following information is control information. "ESC" represents a control code (1b in hexadecimal code). Line 2 beginning with % CNT represents various items of control information. "% CONT"Transfer Status=NG" at line 2 indicates that this is a transfer non-permitting signal. "ESC % CONTROL END at line 3 represents the end of the control information. The aforementioned configuration of printing information is only exemplary and may be of any other format.

Referring back to FIG. 14, the description of the operation of the printer 200 will be continued.

Step S2-50: The interface 1 makes a decision to determine whether the received data is a transfer-log transmitted from other printer. If the answer is YES, the program proceeds to the processing for receiving transfer-log. If the answer is NO, the program proceeds to the processing for receiving print data.

The transfer-log will be described.

FIG. 18 illustrates the transfer-log. Referring to FIG. 18, ESC % CONTROL START at line 1 indicates that the following information is control information. "ESC" represents a control code (1b in hexadecimal code). Line 2 beginning with % CNT represents various items of control information. % CONT"Print Log" at line 2 indicates that this is a transfer-log. Four lines (e.g., lines 3-6) are devoted to the transfer-log. % CNT"Printer Name=printer A" indicates that the name of the printer is A. % CNT"User Name=Yamada" indicates that the name of a person who requested printing is Mr. Yamada. % CNT"Job Name=abc.doc" indicates that the name of a printed document is abc.doc. % CNT"Total Page=5" indicates that the number of printed pages is 5. ESC % CONTROL END represents the end of the control information. The aforementioned configuration of printing information is only exemplary and may be of any other format.

As described above, the aforementioned flowchart determines the various processes that should be performed for the signals received in the printer 200: processing for extracting print-control information, processing for requesting to obtain print log, processing for requesting for transfer-permission, processing for receiving transfer status, processing for receiving transfer-log, and processing for receiving print data. The respective processes will now be described. The processing for extracting print-control information has been described at step S2-11.

Figure 19:
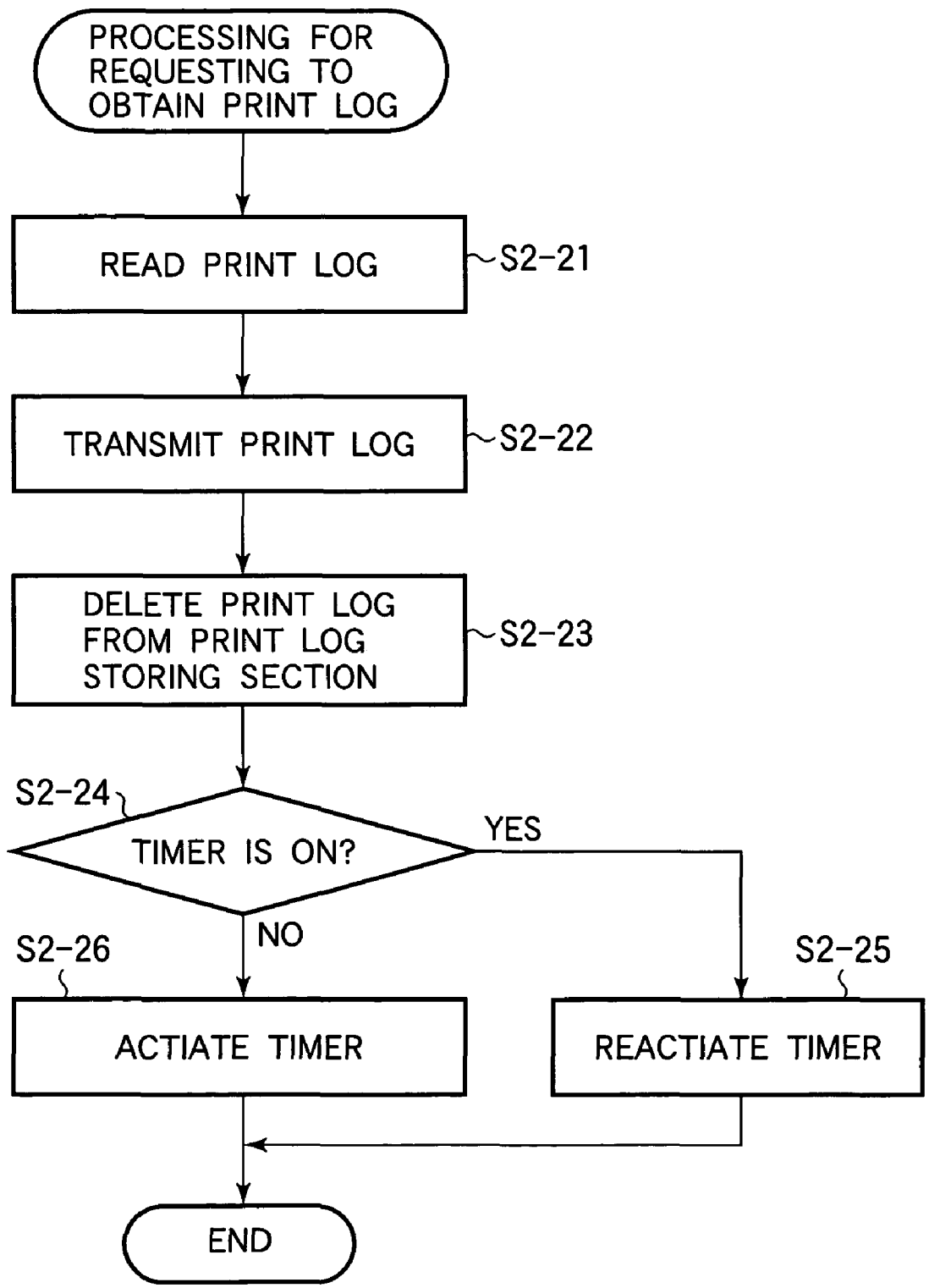
FIG. 19 is a flowchart illustrating the processing for requesting to obtain print log.

FIG. 19 is a flowchart illustrating the processing for requesting to obtain print log. The flowchart describes the operation in which a request-to-obtain-print-log is received from the server 120.

Step S2-21: The CPU 46 reads the print log from the print log storing section 4.

Step S2-22: The CPU 46 transmits the print log to the server 120 via the interface 1.

Step S2-23: The CPU 46 deletes the print log (FIG. 5), which was sent to the server 120, from the print log storing section 4. This is because this print log is no longer necessary to be held in the print log storing section 4.

Step S2-24: The CPU 46 makes a decision to determine whether the timer in the interval detecting section 5 has been activated. This timer detects a time elapsed from when a request-to-obtain-print-log is received until reception of the next request-to-obtain-print-log is received. If the answer is YES, the program proceeds to step S2-25. In the answer is NO, the program proceeds to step S2-26.

Step S2-25: The CPU 46 reactivates the timer and the program ends.

Step S2-26: The CPU 46 activates the timer and the program ends.

It should be noted that performing step S2-25 or step S2-26 enables accurate measurement of the time length before the request-to-obtain-print-log is received.

Figure 20:
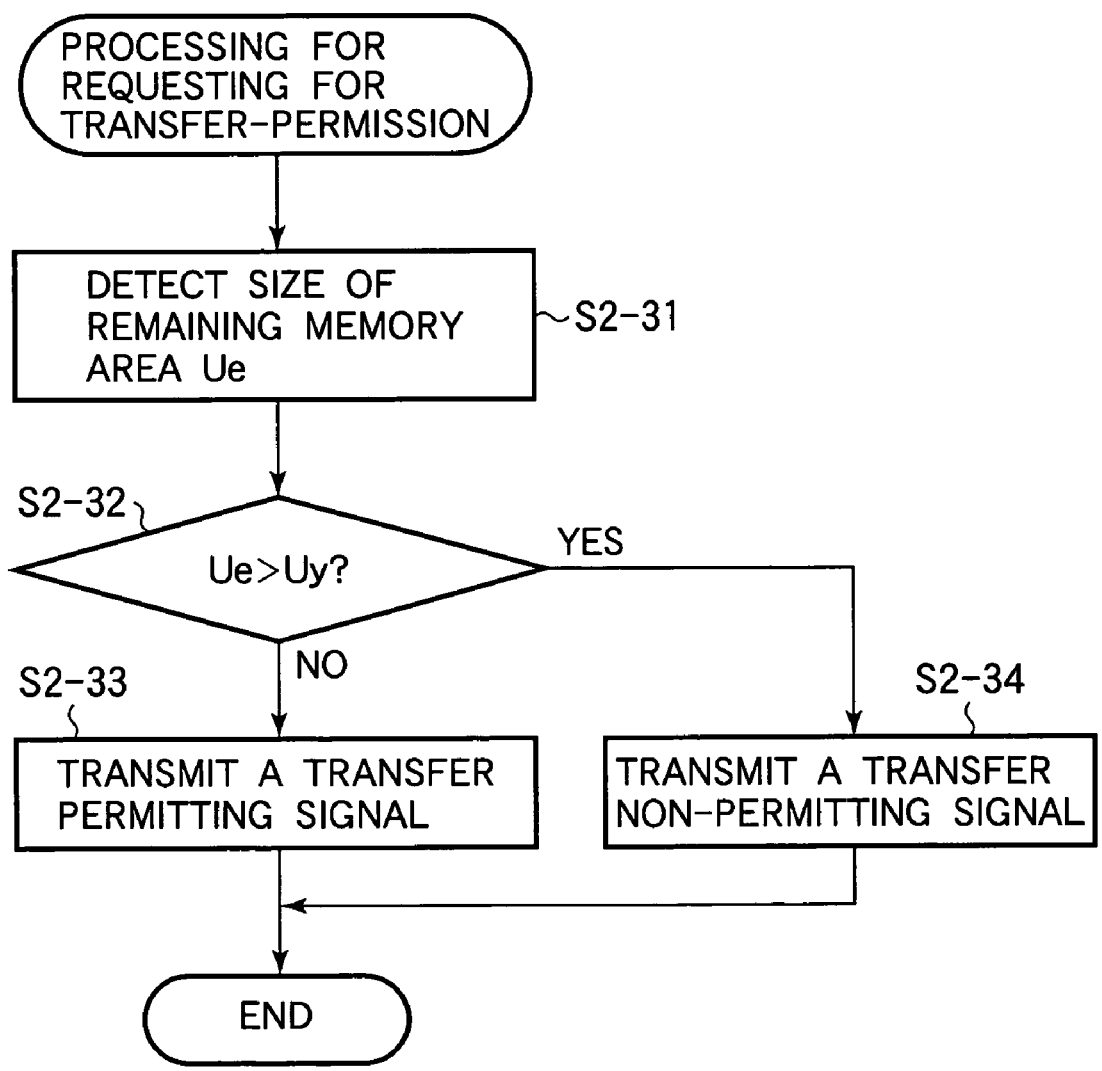
FIG. 20 is a flowchart illustrating the processing for requesting for transfer-permission.

FIG. 20 is a flowchart illustrating the processing for requesting for transfer-permission.

Step S2-31: The transfer permission requesting section 43 (FIG. 13) detects the size of remaining memory area Ue of the print log storing section 4.

Step S2-32: The transfer permission requesting section 43 compares the Ue with the amount of data Uy of the data to be transferred. If the answer is YES, the program proceeds to step S2-33. If the answer is NO, the program proceeds to S2-34.

Step S2-33: The transfer permission requesting section 43 transmits a transfer permitting signal to the printer of a source of request via the interface 1, and then the program ends.

Step S2-34: The transfer permission requesting section 43 transmits a transfer non-permitting signal to the printer of a source of request via the interface 1 and then the program ends.

Figure 21:
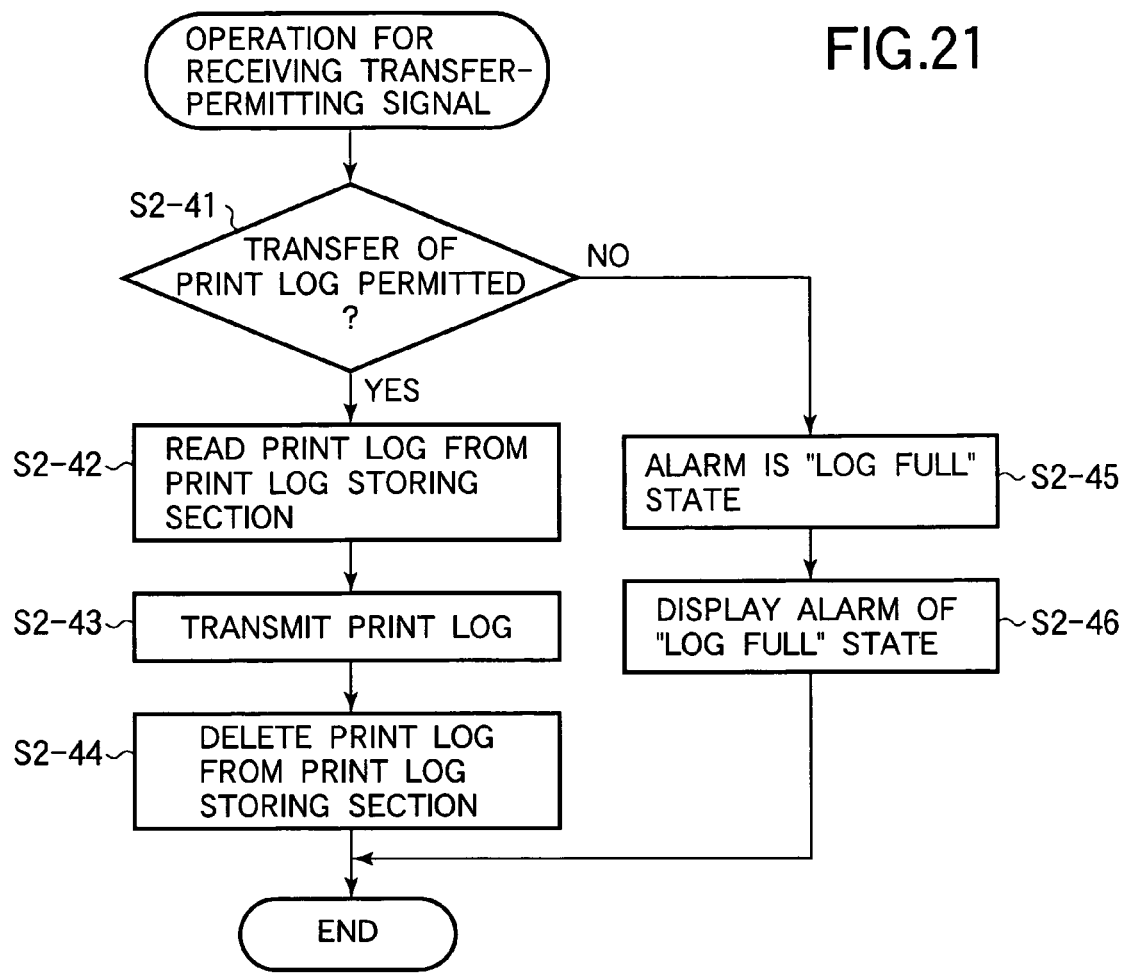
FIG. 21 is a flowchart illustrating the processing for receiving transfer status.

FIG. 21 is a flowchart illustrating the processing for receiving transfer status. The flowchart describes the operation in which the transfer permitting signal (FIG. 16) is received from other printer.

Step S2-41: The print log transferring section 42 makes a decision to determine whether transfer of print log is allowed. If the answer is YES, the program proceeds to step S2-42. If the answer is NO, the program proceeds to step S2-45.

Step S2-42: The print log transferring section 42 reads the print log from print log storing section 4.

Step S2-43: The print log transferring section 42 transmits the print log via the interface 1 to other printer that permits transfer of the print data (or is ready to receive the print data).

Step S2-44: The print log transferring section 42 deletes the print log, which was sent to other printer, from the print log storing section 4. Because the print log no longer needs to be held in the print log storing section 4.

Step S2-45: The print log transferring section 42 determines that the other printer is in a "log full" state.

Step S2-46: The print log transferring section 42 displays an alarm indicative of a "log full" state on the display of the operation panel 8. Then, the program ends.

Figure 22:
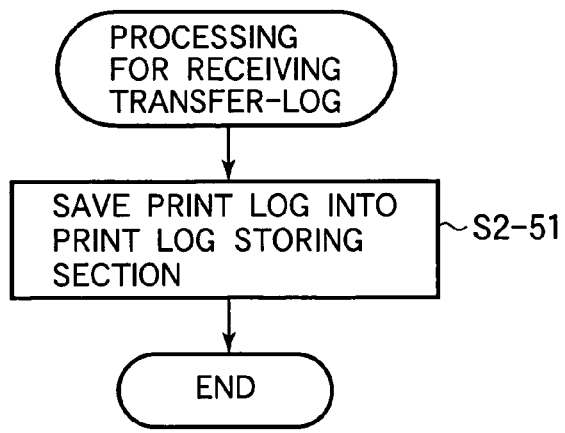
FIG. 22 is a flowchart illustrating the processing for receiving transfer-log.

FIG. 22 is a flowchart illustrating the processing for receiving transfer-log.

Step S2-51: The transfer accepting section 44 receives a print log and stores it into an address of the print log storing section 4. Then, the program ends.

Figure 23:
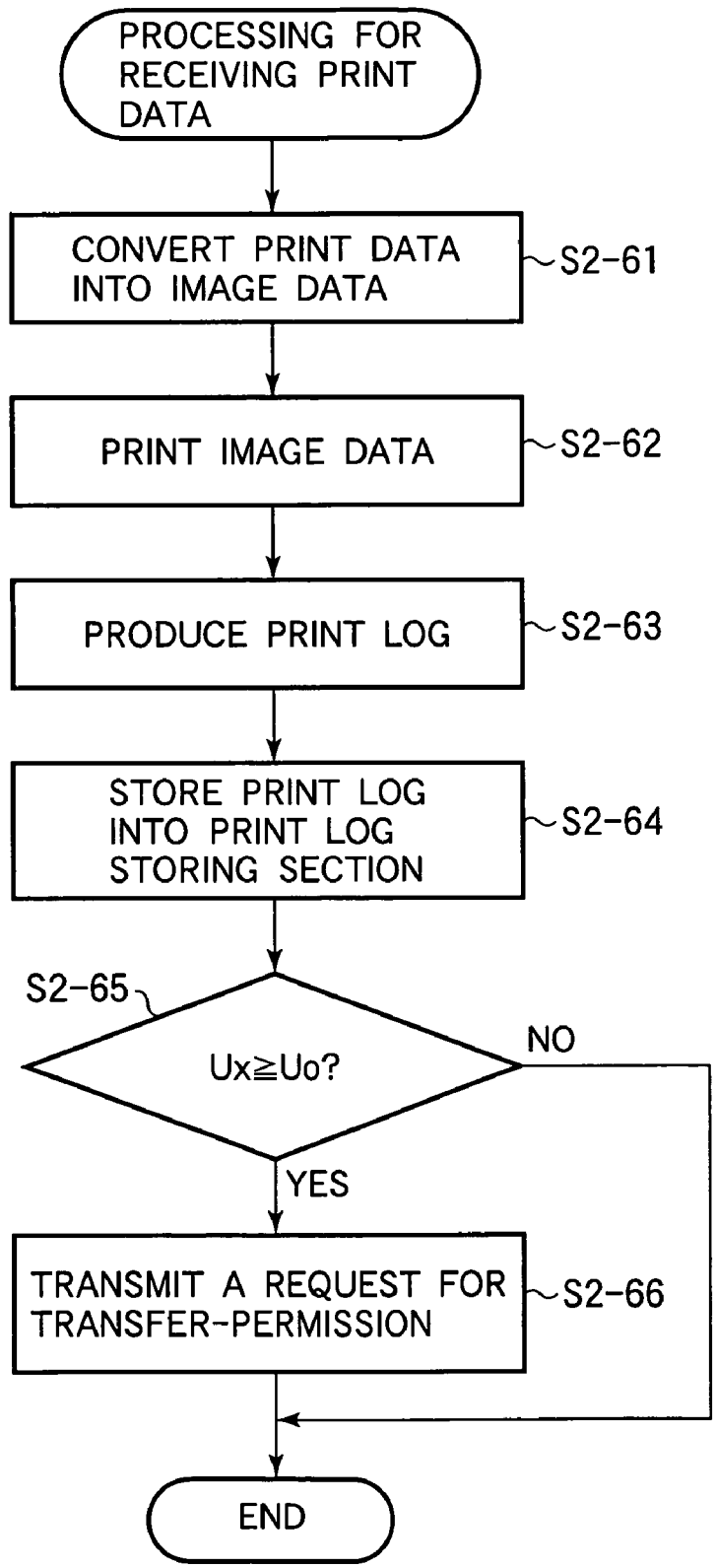
FIG. 23 is a flowchart illustrating the processing for receiving print data.

FIG. 23 is a flowchart illustrating the processing for receiving print data.

Step S2-61: The received data is print data. Thus, the CPU 46 converts the print data into image data (dot data), which in turn is expanded in the RAM 10.

Step S2-62: The image forming section 3 receives the image data (dot data) and prints the image data on a print medium.

Step S2-63: The CPU 46 produces a print log (FIG. 5).

Step S2-64: The CPU 46 stores the print log into the print log storing section 4.

Step S2-65: The transfer permission requesting section 41 makes a decision to determine whether the amount of data Ux for all of the print logs stored in the print log storing section 4 is larger than the size Uo of a memory area devoted in the print log storing section 4. If the answer is YES, the program proceeds to step S2-66. If the answer is NO, the program ends. The user sets the size Uo such that the Uo is smaller than the total capacity of the print log storing section 4.

Step S2-66: The transfer permission requesting section 41 transmits a request for transfer-permission to a printer whose name has been previously stored in the print-control information storing section 45 and is ready to accept the print log. Then, the program ends.

As described above, the print log can be transferred to another printer that has been previously registered, before the print log storing section overflows due to an abnormality occurred in the server. This prevents the inconvenience of halting or aborting offprint log. The thus transferred and stored in other printer may be returned to an initially intended printer through a predetermined procedure after having recovered from the abnormality.

Third Embodiment

In a third embodiment, when an abnormality occurs in a server, the print log may be transferred to a predetermined host terminal apparatus which in turn temporarily holds the print log.

Figure 24:
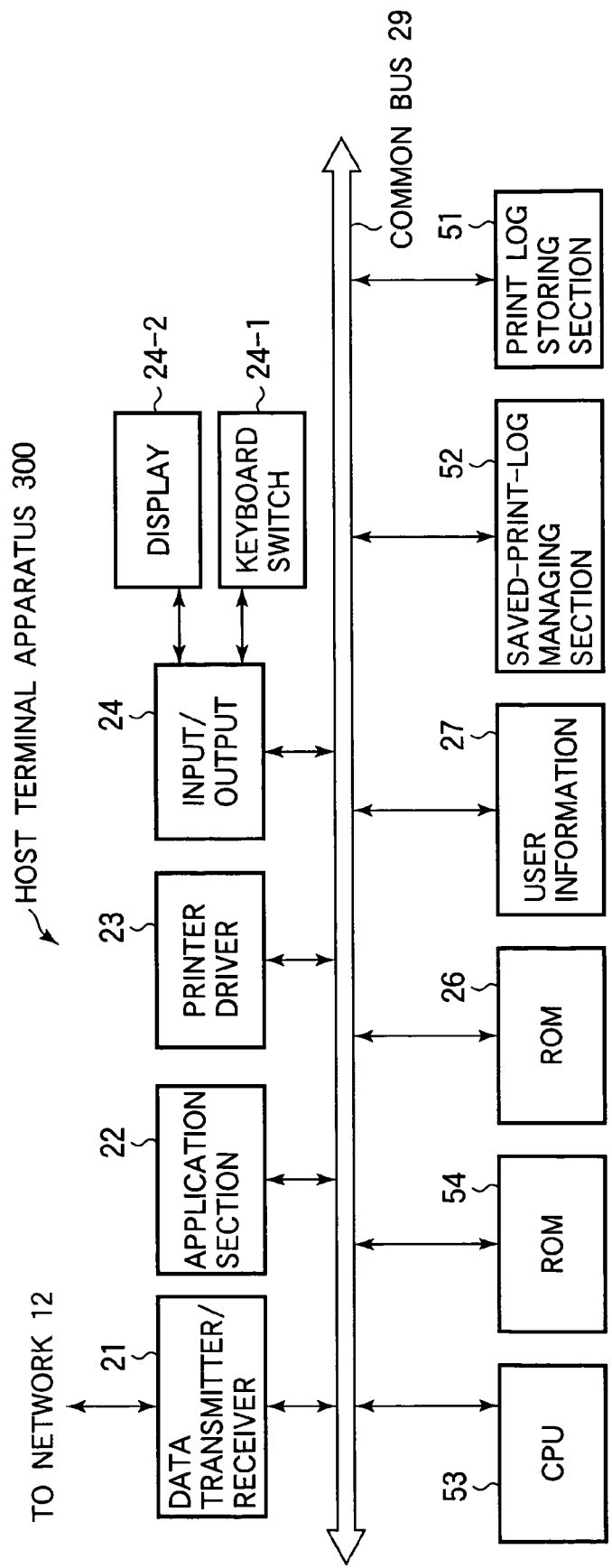
FIG. 24 is a block diagram of a host terminal apparatus according to a third embodiment.

FIG. 24 is a block diagram of a host terminal apparatus according to the third embodiment. The host terminal apparatus 300 takes the form of, for example, a personal computer that produces print data. A user inputs desired image information into the host terminal apparatus 300. The host terminal apparatus 300 converts the image information into print data, then attaches various items of control information to the print data, and finally transmits the print data together with the control information to the printer 200 (FIG. 13) over the network 12. The host terminal apparatus 300 includes a data transmitter/receiver 21, application section 22, printer driver 23, input/output port 24, RAM 26, user information 27, print log storing section 51, saved-print log managing section 52, CPU 53, ROM 54, and common bus 29. A description will be given of the third embodiment in terms of portions different from those of the first and second embodiments. Elements similar to those of the first and second embodiments have been given the same reference numerals and their description is omitted.

The print log storing section 51 is a memory that receives a print log from the printer 200 (FIG. 13) and holds the received print log therein. The print log storing section 51 takes the form of a non-volatile memory such as a flash memory. Instead of, for example, a flash memory, the print log storing section 51 may take the form of a large-capacity memory such as an HDD that is incorporated in the host terminal apparatus.

The saved-print log managing section 52 is an application that classifies the signals, received in the data transmitter/receiver 21 over the network 12, into various items of signals. The saved-print log managing section 52 processes each of the various items of signals. The saved-print log managing section 52 is activated when the CPU 54 executes a program previously stored in the ROM 54.

The CPU 53 is a microprocessor that executes control programs stored in a hard disk, not shown, or the ROM 54 to perform overall control of the apparatus. In the third embodiment, the CPU 53 executes a control program previously stored in the ROM 54 or a hard disk, not shown, to activate the saved-print log managing section 52.

The ROM 54 is a read only memory that stores a control program and data associated with the control program, the control program being executed by the CPU 53 for performing the overall control of the apparatus. In the third embodiment, the ROM 54 also stores a control program and data associated, the program being executed by the CPU 53 to activate the saved-print log managing section 52.

The operations of the host apparatus 300 and the printer 200 will be described.

Figure 25:
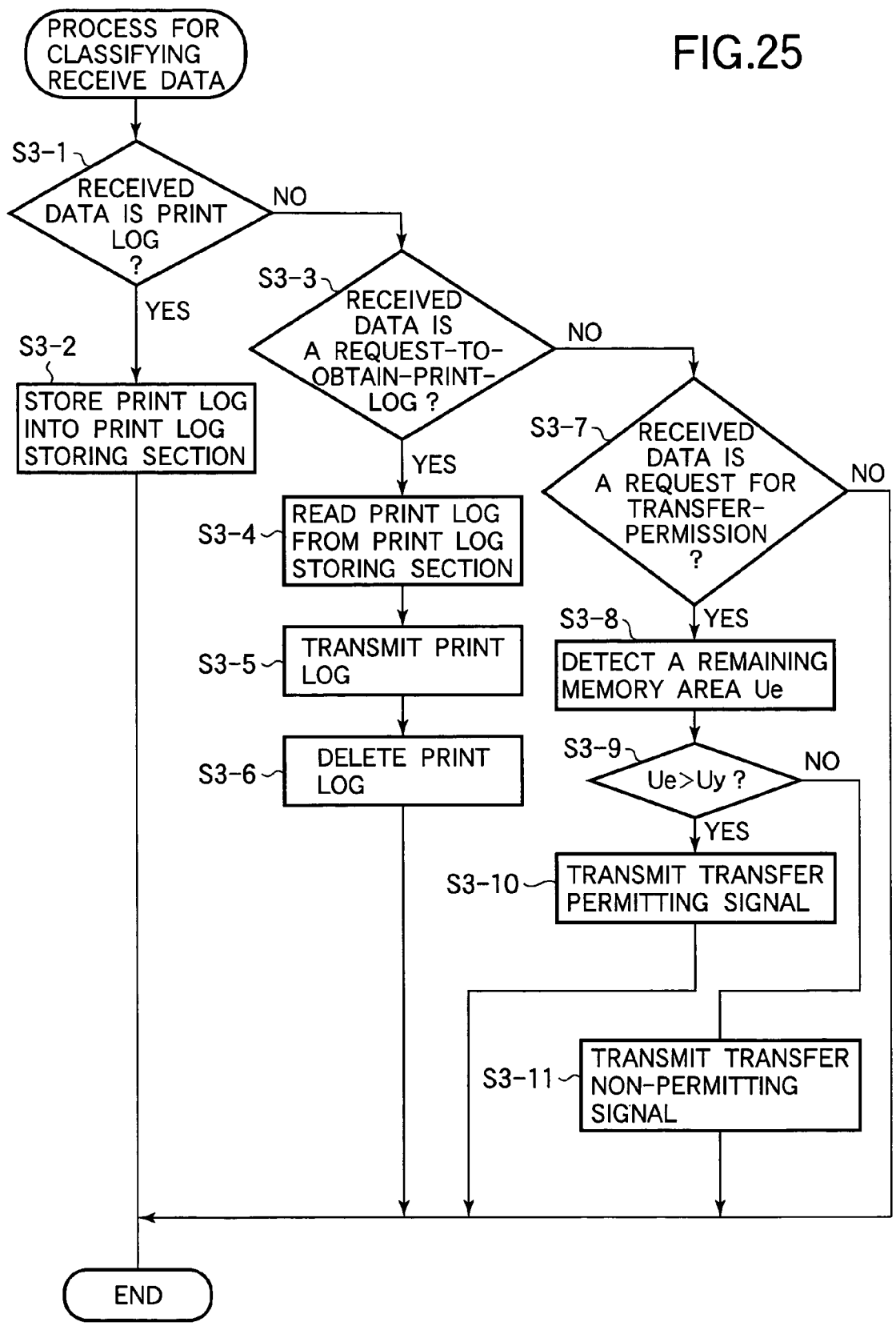
FIG. 25 is a flowchart illustrating the operation of the host apparatus.

FIG. 25 is a flowchart illustrating the operation of the host apparatus.

The flowchart describes the process for classifying received data in the host terminal apparatus 300 (FIG. 24).

Step S3-1: The saved-print log managing section 52 makes a decision to determine whether the data received through the data transmitter/receiver 21 is a print log transmitted from the printer 200. If the answer is YES, the program proceeds to step S3-2. If the answer is NO, the program proceeds to step S3-3.

Step S3-2: The saved-print log managing section 52 stores the print log into the print log storing section 51 and the program ends.

Step S3-3: The saved-print log managing section 52 makes a decision to determine whether the data received through the data transmitter/receiver 21 is a request-to-obtain-print-log transmitted from the server 120 (FIG. 6). If the answer is YES, the program proceeds to step S3-4. If the answer is NO, the program proceeds to step S3-7.

Step S3-4: The saved-print log managing section 52 reads the print log from the print log storing section 51.

Step S3-5: The saved-print log managing section 52 transmits the print log to the server 120 through the data transmitter/receiver 21.

Step S3-6: The saved-print log managing section 52 deletes the print log, which has been sent to the server 120, from the print log storing section 51. Because this print log no longer needs to be held in the print log storing section 51.

Step S3-7: The saved-print log managing section 52 makes a decision to determine whether the data received through the data transmitter/receiver 21 is a request for transfer-permission transmitted from the printer 200. If the answer is YES, the program proceeds to S3-8. If the answer is NO, the program ends.

Step S3-8: The saved-print log managing section 52 detects a remaining memory area Ue of the print log storing section 51.

Step S3-9: The saved-print log managing section 52 compares the remaining memory area Ue with the amount Uy of data to be transmitted. If Ue>Uy, the program proceeds to step S3-10. If the answer is NO, the program process to step S3-11.

Step S3-10: The saved-print log managing section 52 transmits the transfer permitting signal to the printer of a source of request through the data transmitter/receiver 21. Then, the program ends.

Step S3-11: The saved-print log managing section 52 transmits the transfer non-permitting signal in FIG. 17 to the printer of a source of request through the data transmitter/receiver 21. Then, the program ends.

Figure 26:
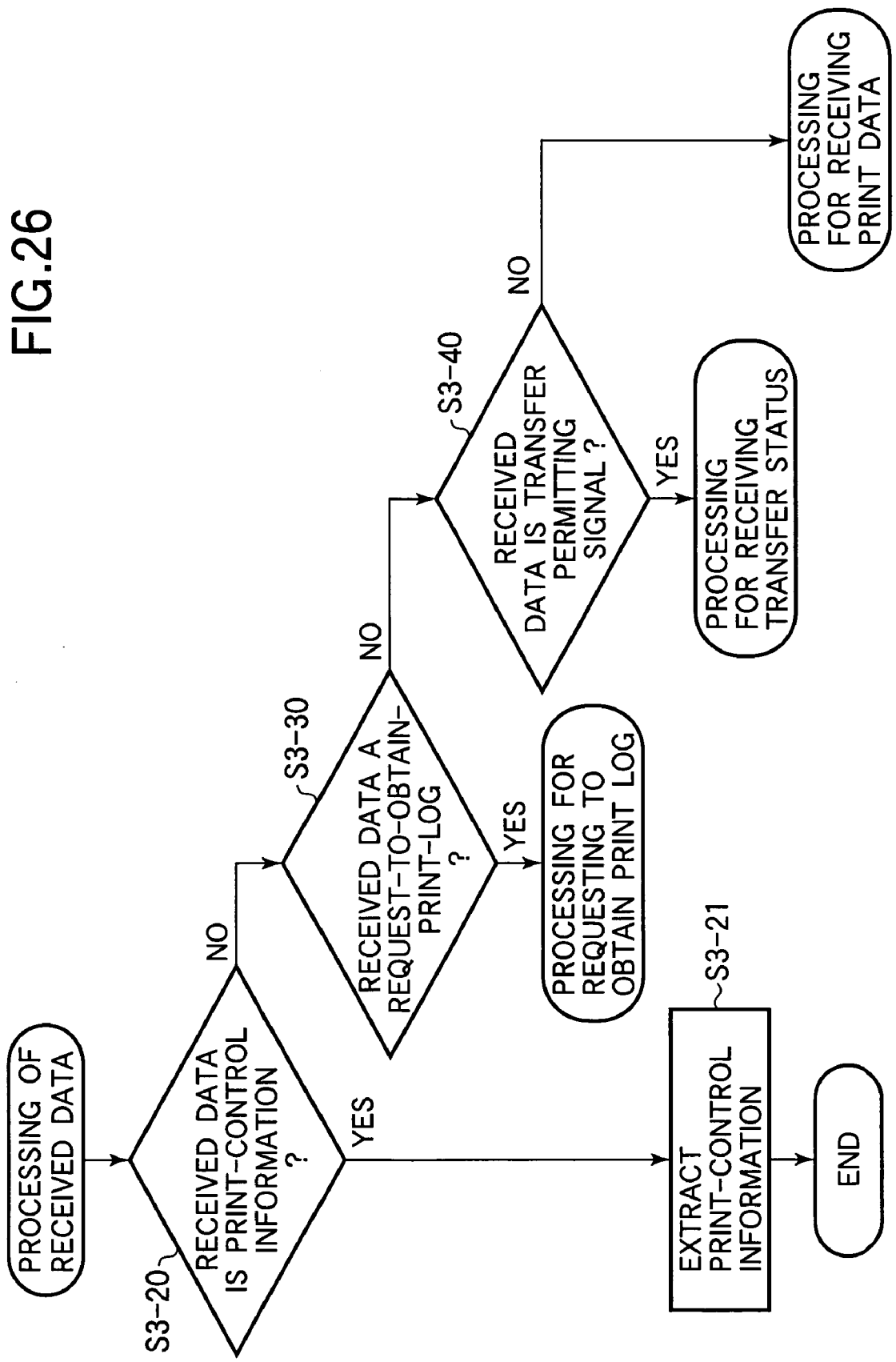
FIG. 26 is a flowchart illustrating the operation of the printer.

FIG. 26 is a flowchart illustrating the operation of the printer. The flowchart describes the operation for determining various processes that should be performed for the signals received in the printer 200: processing for extracting print-control information, processing for requesting to obtain print log, processing for receiving transfer status, and processing for receiving print data.

Step S3-20: The interface 1 makes a decision to determine whether the received data is print-control information (FIG. 2) transmitted from the host terminal apparatus 300. If the answer is YES, the program proceeds to step S3-21. If the answer is NO, the program proceeds to step S3-30.

Step S3-21: The CPU 46 (FIG. 3) extracts the print-control information from the received data, and stores it into the print-control information storing section 45 (FIG. 13). Then, the program ends.

Step S3-30: The interface 1 makes a decision to determine whether the received data is the request-to-obtain-print-log transmitted from the server 120. If the answer is YES, the program proceeds to the processing for requesting to obtain print log. If the answer is NO, the program proceeds to S3-40.

Step S3-40: The interface 1 (FIG. 13) makes a decision to determine whether the received data is a transfer permitting signal transmitted from other printer. If the answer is YES, the program proceeds to the processing for receiving transfer permitting signal. If the answer is NO, the program proceeds to the processing for receiving print data.

As described above, the aforementioned flowchart determines the various processes that should be performed for the signals received in the printer 200: processing for extracting print-control information, processing for requesting to obtain print log, processing for receiving transfer status, and processing for receiving print data. The respective processes will now be described with reference to corresponding flowcharts. The processing for extracting print-control information has been described at step S3-21.

Figure 27:
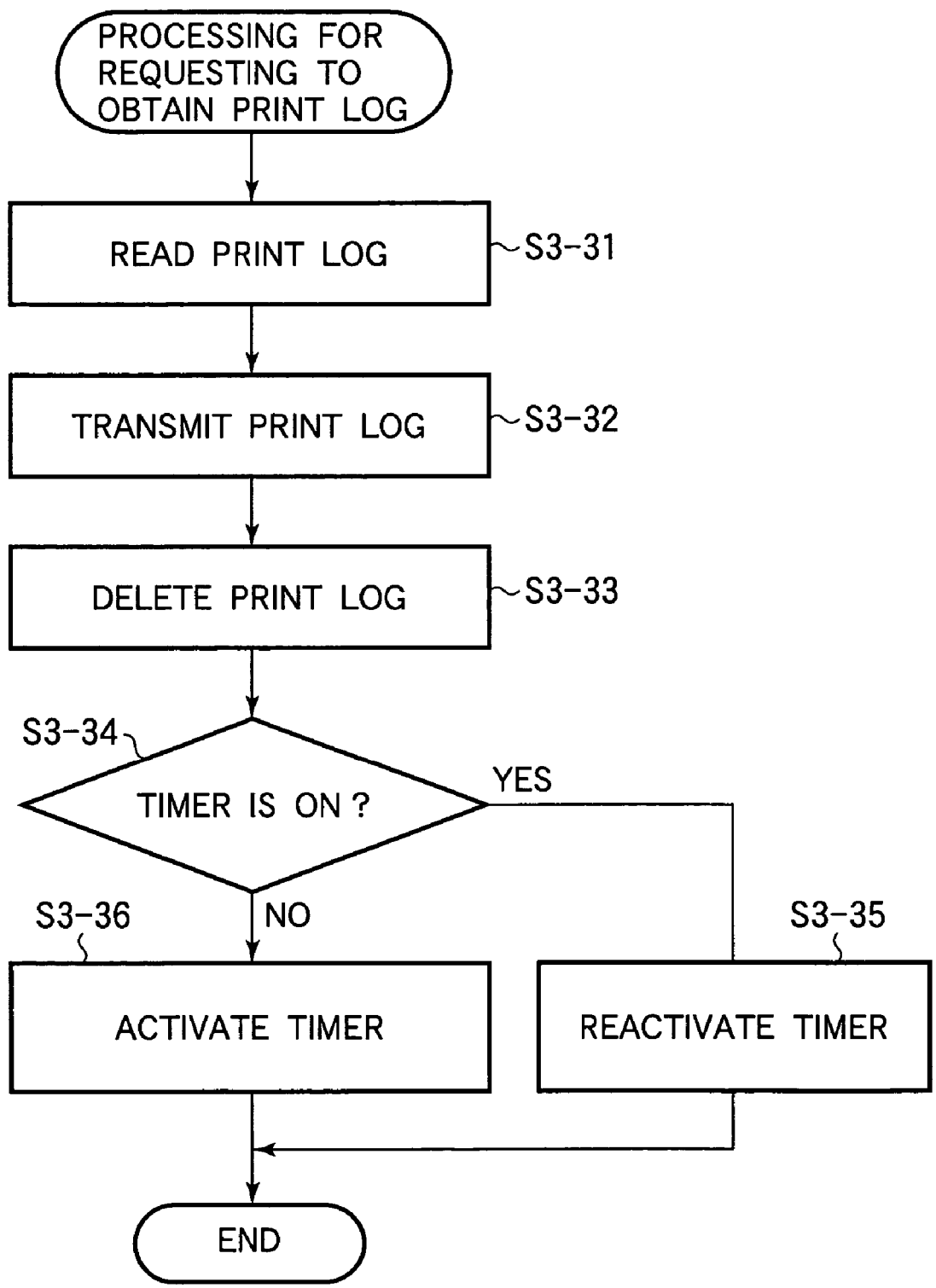
FIG. 27 is a flowchart illustrating the processing for requesting to obtain print log.

FIG. 27 is a flowchart illustrating the processing for requesting to obtain print log. The flowchart describes the operation in which the request-to-obtain-print-log is received from the server.

Step S3-31: The CPU 46 reads the print log from the print log storing section 4.

Step S3-32: The CPU 46 transmits the print log to the server 120 via the interface 1.

Step S3-33: The CPU 46 deletes the print log (FIG. 5), which was sent to the server 120, from the print log storing section 4. This is because this print log no longer needs to be held in the print log storing section 4.

Step S3-34: The CPU 46 makes a decision to determine whether the timer in the interval detecting section 5 has been activated. The timer detects a time elapsed from when a request-to-obtain-print-log is received until reception of the next request-to-obtain-print-log is received. If the answer is YES, the program proceeds to step S3-35. In the answer is NO, the program proceeds to step S3-36.

Step S3-35: The CPU 46 reactivates the timer, and the program ends.

Step S3-36: The CPU 46 activates the timer, and the program ends.

It should be noted that performing step S2-35 or step S2-36 enables accurate measurement of the time length before the request-to-obtain-print-log is received.

Figure 28:
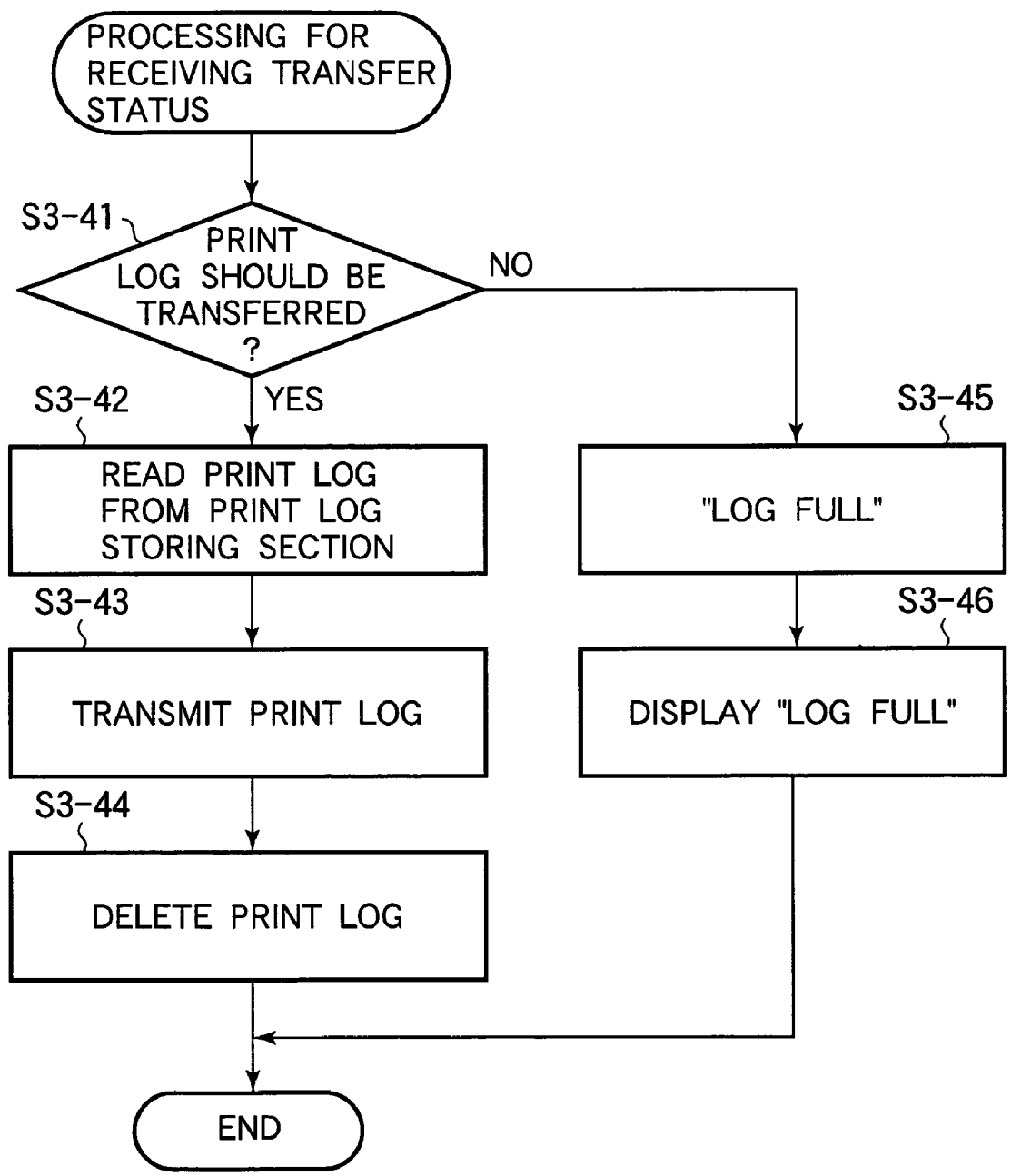
FIG. 28 is a flowchart illustrating the processing for receiving transfer status.

FIG. 28 is a flowchart illustrating the processing for receiving transfer status.

Step S3-41: The print log transferring section 42 makes a decision to determine whether the print log should be transferred. If the answer is YES, the program proceeds to step S3-42. If the answer is NO, the program proceeds to S3-45.

Step S3-42: The print log transferring section 42 reads the print log from the print log storing section 4.

Step S3-43: The print log transferring section 42 transmits the print log through the interface 1 to other printer that accepted to receive the print log.

Step S3-44: The print log transferring section 42 deletes the print log, which has been transmitted to other printer, from the print log storing section 4. This is because the print log no longer needs to be held in the print log storing section 4.

Step S3-45: The print log transferring section 42 determines that the other printer is in a "log full" state.

Step S3-46: The print log transferring section 42 displays an alarm of a "log full" state on the display of the operation panel 8. Then, the program ends.

Figure 29:
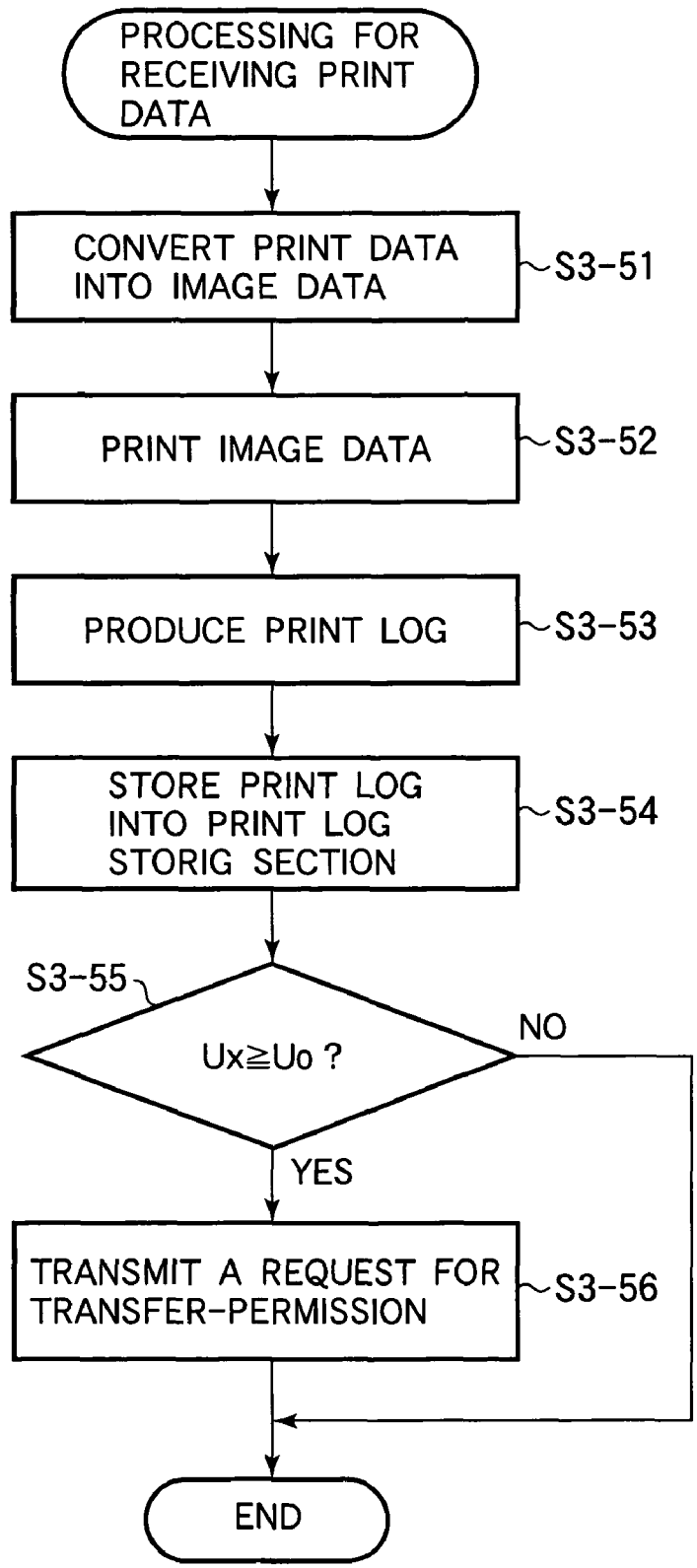
FIG. 29 is a flowchart illustrating the processing for receiving print data.

FIG. 29 is a flowchart illustrating the processing for receiving print data.

Step S3-51: The received data is print data. Thus, the CPU 46 converts the print data into image data (dot data), which in turn is expanded in the RAM 10.

Step S3-52: The image forming section 3 receives the image data (dot data) and prints on a print medium.

Step S3-53: The CPU 46 produces the print log.

Step S3-54: The CPU 46 stores the print log into the print log storing section 4.

Step S3-55: The transfer permission requesting section 41 makes a decision to determine whether the amount of data Ux for all the print logs stored in the print log storing section 4 is larger than the size Uo of a memory area devoted in the print log storing section 4. If the answer is YES, the program proceeds to step S3-56. If the answer is NO, the program ends. The user sets the size Uo such that the Uo is smaller than the total capacity of the print log storing section 4.

Step S-56: The transfer permission requesting section 41 transmits a request for transfer-permission to the host terminal apparatus previously stored in the print-control information storing section 45. The print-control information storing section 45 previously stores the information on other printers to which the print log is temporarily saved or the host terminal apparatuses.

As described above, the print log can be transferred to another printer that has been previously registered, before the print log storing section overflows due to an abnormality occurred in the server. This prevents the inconvenience of halting or aborting offprint log. The print log temporarily saved to the host apparatus may be returned to the initially intended printer through a predetermined procedure after having recovered from the abnormality.

While the present invention has been described with respect to a printer, the present invention may also be applied to other apparatuses such as facsimile machines and copying machines.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image forming apparatus comprising:
a print-log information producing section that produces print log information on a print job that has been printed in accordance with data received in the image forming apparatus;
an operation panel including a display;
a storing section that stores the print log information;
an interface that receives a request-to-obtain-print-log outputted at regular intervals from an external apparatus and provides the print log information stored in said storing section directly to the external apparatus in response to the request-to-obtain-print-log, the external apparatus using the print log information to compute an amount of use of the image forming apparatus;
an operation condition detecting section that makes a determination that the external apparatus is not normally operating and that the print log information cannot be sent to the external apparatus because the external apparatus is not normally operating, the determination being made if the interface fails to receive the request-to-obtain-print-log in a certain period of time; and
an information-outputting section that outputs an item of information indicative that the external apparatus is not normally operating, the item of information being displayed on the display to a user of the image forming apparatus if the print-log information that should be sent to the external apparatus is in the storing section and the operation condition detecting section determines that the print log information cannot be sent to the external apparatus, and that does not output the item of information if the print log information that should be sent to the external apparatus is not in the storing section and the operation condition detecting section determines that the print log information cannot be sent to the external apparatus.

2. The image forming apparatus according to claim 1, wherein said operation condition detecting section comprises a time interval measuring section that detects an elapsed time after a most recent communication between the image forming apparatus and the external apparatus, wherein when the elapsed time exceeds a value, said operation condition detecting section determines that the external apparatus is not normally operating.

3. The image forming apparatus according to claim 1, wherein the information indicative that the external apparatus is not normally operating is a first item of information, said information-outputting section provides a second item of information to a management apparatus that manages the external apparatus, the second item of information being based on the information indicative that the external apparatus is not normally operating.

4. The image forming apparatus according to claim 1, further comprising a print-control information storing section stores a message that should be transmitted to the management apparatus.

5. The image forming apparatus according to claim 1, further comprising a print log transferring section, wherein when a total amount of data of print logs that should be stored is larger than a size of remaining memory area of said storing section, the print log transferring section transfers a print log to either another image forming apparatus or to a host terminal apparatus, the print log being a print log that cannot be stored in said storing section.

6. The image forming apparatus according to claim 5, further comprising a transfer permission requesting section that inquires either the another image forming apparatus or the host terminal apparatus of whether either the another image forming apparatus or the host terminal apparatus is ready to hold the print log that cannot be stored in said storing section.

7. The image forming apparatus according to claim 1, further comprising a transfer accepting section that receives a print log from another image forming apparatus connected via a network, the transfer accepting section storing the print log.

8. The image forming apparatus according to claim 7, further comprising a transfer acceptance determining section that receives a request for a transfer-permission from another image forming apparatus connected via a network, the transfer acceptance determining section makes a decision to determine whether the image forming apparatus is ready to hold the print log.

9. The image forming apparatus according to claim 1, wherein the print log information contains at least a name of a printer, a name of a user, a name of a print job, and a total number of pages of the print job.

10. An image forming apparatus comprising:
a print-log information producing section that produces print log information on a print job that has been printed in accordance with data received in the image forming apparatus;
an operation panel including a display;
a storing section that stores the print log information;
an interface that receives a request-to-obtain-print-log outputted at regular time intervals from an external apparatus and provides the print log information stored in said storing section directly to the external apparatus in response to the request-to-obtain-print-log, the external apparatus using the print log information to compute an amount of use of the image forming apparatus;
an operation condition detecting section that makes a determination that the external apparatus is down and the print log information cannot be sent to the external apparatus, the determination being made if the interface fails to receive the request-to-obtain-print-log in a certain period of time; and
an information-outputting section that outputs an item of information indicative that the external apparatus is down to a user of the image forming apparatus to the display of the operation panel,
wherein the information-outputting section outputs the item of information if the print log information that should be sent to the external apparatus is in the storing section and the operation condition detecting section determines that the print log information cannot be sent to the external apparatus because the external apparatus is down, and
wherein the information-outputting section does not output the item of information if the print log information that should be sent to the external apparatus is not in the storing section and said operation condition detecting section determines that the print log information cannot be sent to the external apparatus.

11. The image forming apparatus according to claim 10, wherein the print log information contains at least a name of a printer, a name of a user, a name of a print job, and a total number of pages of the print job.

* * * * *